(12) United States Patent
Parks

(10) Patent No.: US 9,132,348 B2
(45) Date of Patent: Sep. 15, 2015

(54) INSTRUMENT GAME SYSTEM AND METHOD

(75) Inventor: Jakob Parks, San Mateo, CA (US)

(73) Assignee: Ubisoft Entertainment, Rennes (FR)

( * ) Notice: Subject to any disclaimer, the term of this patent is extended or adjusted under 35 U.S.C. 154(b) by 0 days.

(21) Appl. No.: 13/612,648

(22) Filed: Sep. 12, 2012

(65) Prior Publication Data

US 2013/0065656 A1 Mar. 14, 2013

Related U.S. Application Data

(62) Division of application No. 11/865,681, filed on Oct. 1, 2007.

(60) Provisional application No. 60/902,066, filed on Feb. 20, 2007.

(51) Int. Cl.
*G04B 13/00* (2006.01)
*A63F 13/40* (2014.01)
*G10H 1/36* (2006.01)

(52) U.S. Cl.
CPC .............. *A63F 13/10* (2013.01); *G10H 1/368* (2013.01); *A63F 2300/1062* (2013.01); *A63F 2300/61* (2013.01); *A63F 2300/638* (2013.01); *A63F 2300/8047* (2013.01); *G10H 2210/091* (2013.01); *G10H 2220/015* (2013.01); *G10H 2220/151* (2013.01)

(58) Field of Classification Search
None
See application file for complete search history.

(56) References Cited

U.S. PATENT DOCUMENTS

| | | | |
|---|---|---|---|
| 4,264,845 A | 4/1981 | Bednarz | |
| 4,318,327 A | 3/1982 | Toups | |
| 4,919,030 A | 4/1990 | Perron, III | |
| 5,036,742 A | 8/1991 | Youakim | |
| 5,214,231 A | 5/1993 | Ernst et al. | |
| 5,270,475 A | 12/1993 | Weiss et al. | |
| 5,408,911 A | 4/1995 | Weiss et al. | |
| 5,533,903 A | 7/1996 | Kennedy | |
| 5,583,308 A | 12/1996 | Owen | |
| 5,585,583 A | 12/1996 | Owen | |
| 5,627,335 A | 5/1997 | Rigopulos et al. | |
| 5,690,496 A | 11/1997 | Kennedy | |
| 5,763,804 A | 6/1998 | Rigopulos et al. | |
| D398,595 S | 9/1998 | Baer et al. | |

(Continued)

FOREIGN PATENT DOCUMENTS

| | | |
|---|---|---|
| EP | 1465150 | 6/2004 |
| WO | WO 98/58364 | 12/1998 |

(Continued)

OTHER PUBLICATIONS

PCT/US 08/01965, International Search Report, Jun. 9, 2008 (3 pgs).

(Continued)

*Primary Examiner* — Marlon Fletcher
(74) *Attorney, Agent, or Firm* — Erise IP, P.A.

(57) ABSTRACT

A game system and method that uses an instrument as an input encourages a user to play along with the game's soundtrack on an instrument (e.g. guitar, bass, etc.). The game cues the player to play notes and/or chords on the instrument at an appropriate time and then data is collected from the instrument via a connection between the instrument and the apparatus running the game. The game then scores the user based on note/chord and timing information it receives.

12 Claims, 26 Drawing Sheets

(56) References Cited

U.S. PATENT DOCUMENTS

| | | |
|---|---|---|
| 5,834,671 A | 11/1998 | Phoenix |
| 5,990,405 A | 11/1999 | Auten et al. |
| 6,011,212 A | 1/2000 | Rigopulos et al. |
| 6,018,121 A * | 1/2000 | Devecka .................... 84/743 |
| 6,066,791 A | 5/2000 | Renard et al. |
| 6,156,965 A | 12/2000 | Shinsky |
| 6,211,451 B1 | 4/2001 | Tohgi et al. |
| 6,225,547 B1 * | 5/2001 | Toyama et al. ............ 84/611 |
| 6,268,557 B1 | 7/2001 | Devecka et al. |
| 6,281,422 B1 | 8/2001 | Kawamura |
| 6,336,092 B1 | 1/2002 | Gibson et al. |
| 6,347,998 B1 | 2/2002 | Yoshitomi et al. |
| 6,353,169 B1 | 3/2002 | Juszkiewicz et al. |
| 6,353,174 B1 | 3/2002 | Schmidt et al. |
| 6,369,313 B2 * | 4/2002 | Devecka .................... 84/743 |
| 6,390,923 B1 | 5/2002 | Yoshitomi et al. |
| 6,410,835 B2 | 6/2002 | Suzuki et al. |
| 6,425,822 B1 | 7/2002 | Hayashida et al. |
| 6,425,827 B1 | 7/2002 | Nimura |
| 6,429,863 B1 | 8/2002 | LoPiccolo et al. |
| 6,476,304 B2 | 11/2002 | Uehara |
| 6,482,087 B1 | 11/2002 | Egozy et al. |
| 6,486,388 B2 | 11/2002 | Akahori |
| 6,495,747 B2 | 12/2002 | Shimaya et al. |
| 6,515,211 B2 | 2/2003 | Umezawa et al. |
| 6,541,692 B2 | 4/2003 | Miller |
| 6,605,769 B1 | 8/2003 | Juszkiewicz |
| 6,628,313 B1 | 9/2003 | Minakuchi et al. |
| 6,645,067 B1 | 11/2003 | Okita et al. |
| 6,686,531 B1 | 2/2004 | Pennock et al. |
| 6,740,803 B2 | 5/2004 | Brinkman et al. |
| 6,751,439 B2 | 6/2004 | Tice et al. |
| 6,835,887 B2 | 12/2004 | Devecka |
| 6,850,252 B1 | 2/2005 | Hoffberg |
| 6,870,085 B2 | 3/2005 | MacCutcheon |
| 6,969,797 B2 | 11/2005 | Brinkman et al. |
| 6,974,325 B2 | 12/2005 | D'Zmura |
| 7,019,205 B1 | 3/2006 | Fujisawa et al. |
| 7,020,635 B2 | 3/2006 | Hamilton et al. |
| 7,030,307 B2 | 4/2006 | Wedel |
| 7,030,311 B2 | 4/2006 | Brinkman et al. |
| 7,034,217 B2 | 4/2006 | Pachet |
| 7,081,580 B2 | 7/2006 | Brinkman et al. |
| 7,103,873 B2 | 9/2006 | Tanner et al. |
| 7,129,407 B2 | 10/2006 | Hiratsuka et al. |
| 7,151,214 B2 | 12/2006 | Barry |
| 7,157,638 B1 | 1/2007 | Sitrick |
| 7,164,076 B2 | 1/2007 | McHale et al. |
| 7,174,510 B2 | 2/2007 | Salter |
| 7,288,712 B2 | 10/2007 | Uehara |
| 7,320,643 B1 * | 1/2008 | Brosius et al. ................ 463/37 |
| 7,335,833 B2 | 2/2008 | Smith et al. |
| D573,605 S | 7/2008 | Amacker |
| 7,404,202 B2 | 7/2008 | Hamilton et al. |
| 7,423,214 B2 | 9/2008 | Reynolds et al. |
| 7,435,178 B1 | 10/2008 | Tam et al. |
| 7,439,441 B2 | 10/2008 | Jarrett et al. |
| 7,446,253 B2 | 11/2008 | Knapp et al. |
| 7,453,035 B1 | 11/2008 | Evans et al. |
| 7,459,624 B2 * | 12/2008 | Schmidt et al. ............. 84/477 R |
| 7,472,525 B2 | 1/2009 | Griggs et al. |
| 7,486,791 B2 | 2/2009 | Ohbi et al. |
| 7,487,549 B2 | 2/2009 | Kawamoto et al. |
| 7,521,619 B2 | 4/2009 | Salter |
| 7,562,312 B2 | 7/2009 | Rochford et al. |
| 7,663,044 B2 | 2/2010 | Katsuta |
| 7,675,514 B2 | 3/2010 | Ni et al. |
| 7,758,427 B2 | 7/2010 | Egozy |
| 7,773,121 B1 | 8/2010 | Huntsberger et al. |
| 7,799,984 B2 * | 9/2010 | Salter ......................... 84/477 R |
| 7,806,759 B2 * | 10/2010 | McHale et al. .................. 463/7 |
| 7,893,337 B2 | 2/2011 | Lenz |
| 7,910,818 B2 * | 3/2011 | Kim et al. ................... 84/477 R |
| 7,923,620 B2 | 4/2011 | Foster |
| 7,935,880 B2 * | 5/2011 | Stoddard et al. ................ 84/609 |
| 7,982,114 B2 * | 7/2011 | Applewhite et al. |
| 8,003,872 B2 * | 8/2011 | Lopiccolo et al. ............. 84/609 |
| 8,026,435 B2 * | 9/2011 | Stoddard et al. ............. 84/477 R |
| 8,076,564 B2 * | 12/2011 | Applewhite ................ 84/477 R |
| 8,079,901 B2 * | 12/2011 | Brosius et al. ..................... 463/7 |
| 8,079,907 B2 | 12/2011 | Egozy |
| 8,080,722 B2 * | 12/2011 | Applewhite et al. ............ 84/609 |
| 8,119,896 B1 | 2/2012 | Smith |
| D664,551 S | 7/2012 | Boyer et al. |
| 8,317,614 B2 * | 11/2012 | McCauley et al. ............. 463/37 |
| 8,465,366 B2 * | 6/2013 | Applewhite et al. ............ 463/36 |
| 8,481,838 B1 | 7/2013 | Smith |
| 8,586,849 B1 | 11/2013 | Smith |
| 2001/0035088 A1 | 11/2001 | Faecher |
| 2001/0039870 A1 | 11/2001 | Shimaya et al. |
| 2001/0040671 A1 | 11/2001 | Metcalf |
| 2001/0045153 A1 | 11/2001 | Alexander et al. |
| 2002/0004191 A1 | 1/2002 | Tice et al. |
| 2002/0088337 A1 * | 7/2002 | Devecka .................... 84/743 |
| 2002/0157521 A1 | 10/2002 | Shahal |
| 2002/0194984 A1 | 12/2002 | Pachet |
| 2003/0066414 A1 | 4/2003 | Jameson |
| 2003/0096556 A1 | 5/2003 | Fong |
| 2003/0151628 A1 | 8/2003 | Salter |
| 2004/0055441 A1 | 3/2004 | Katsuta |
| 2004/0069115 A1 * | 4/2004 | Hiratsuka et al. ............ 84/483.1 |
| 2004/0158462 A1 | 8/2004 | Rutledge et al. |
| 2004/0192430 A1 | 9/2004 | Burak et al. |
| 2004/0233239 A1 | 11/2004 | Lahdesmaki |
| 2004/0255758 A1 | 12/2004 | Klefenz et al. |
| 2005/0034591 A1 | 2/2005 | Chang |
| 2005/0211080 A1 * | 9/2005 | Ueshima et al. ................ 84/724 |
| 2005/0235812 A1 | 10/2005 | Fallgatter |
| 2005/0252362 A1 * | 11/2005 | McHale et al. ................. 84/616 |
| 2006/0020469 A1 | 1/2006 | Rast |
| 2006/0050901 A1 | 3/2006 | Cohen et al. |
| 2006/0107819 A1 * | 5/2006 | Salter ........................... 84/470 R |
| 2006/0107826 A1 | 5/2006 | Knapp et al. |
| 2006/0151803 A1 | 7/2006 | Wesner et al. |
| 2006/0196343 A1 | 9/2006 | Yung |
| 2006/0236850 A1 | 10/2006 | Schaffer |
| 2006/0245599 A1 | 11/2006 | Regnier |
| 2007/0000375 A1 | 1/2007 | Harrison, Jr. |
| 2007/0003073 A1 | 1/2007 | Iriarte |
| 2007/0044638 A1 | 3/2007 | Egan |
| 2007/0051226 A1 | 3/2007 | Diaz |
| 2007/0066403 A1 | 3/2007 | Conkwright |
| 2007/0163427 A1 * | 7/2007 | Rigopulos et al. ............. 84/609 |
| 2007/0163428 A1 * | 7/2007 | Salter ............................ 84/611 |
| 2007/0234885 A1 * | 10/2007 | Schmidt et al. ................. 84/722 |
| 2007/0245881 A1 | 10/2007 | Egozy et al. |
| 2007/0256540 A1 * | 11/2007 | Salter .......................... 84/485 R |
| 2007/0256541 A1 | 11/2007 | McCauley |
| 2007/0256543 A1 | 11/2007 | Evans et al. |
| 2007/0256551 A1 | 11/2007 | Knapp et al. |
| 2008/0078281 A1 | 4/2008 | Katsuta |
| 2008/0113797 A1 | 5/2008 | Egozy |
| 2008/0115657 A1 * | 5/2008 | Wakiyama ...................... 84/614 |
| 2008/0122922 A1 | 5/2008 | Geng |
| 2008/0173162 A1 | 7/2008 | Williams |
| 2008/0200224 A1 | 8/2008 | Parks |
| 2008/0205669 A1 | 8/2008 | Michelet |
| 2008/0289477 A1 | 11/2008 | Salter |
| 2008/0318673 A1 | 12/2008 | Rofougaran |
| 2009/0038467 A1 * | 2/2009 | Brennan ......................... 84/609 |
| 2009/0064851 A1 | 3/2009 | Morris et al. |
| 2009/0098918 A1 | 4/2009 | Teasdale et al. |
| 2009/0100988 A1 | 4/2009 | Villa et al. |
| 2009/0100991 A1 | 4/2009 | Lazovic |
| 2009/0104956 A1 | 4/2009 | Kay et al. |
| 2009/0191932 A1 | 7/2009 | Chiu et al. |
| 2010/0009755 A1 | 1/2010 | Burckart et al. |
| 2010/0016079 A1 | 1/2010 | Jessop |
| 2010/0087254 A1 | 4/2010 | Sullivan |
| 2010/0137048 A1 | 6/2010 | Kim et al. |
| 2010/0137049 A1 | 6/2010 | Epstein |
| 2010/0216549 A1 | 8/2010 | Salter |
| 2010/0313736 A1 * | 12/2010 | Lenz ............................ 84/477 R |
| 2011/0003638 A1 | 1/2011 | Lee et al. |

(56) References Cited

U.S. PATENT DOCUMENTS

| | | | |
|---|---|---|---|
| 2011/0028218 A1 | 2/2011 | Gomes et al. | |
| 2011/0203442 A1 | 8/2011 | Raveendran | |
| 2011/0207513 A1 | 8/2011 | Cross et al. | |
| 2011/0247479 A1 | 10/2011 | Helms et al. | |
| 2011/0259176 A1 | 10/2011 | Pillhofer et al. | |
| 2012/0090446 A1 | 4/2012 | Moreno | |
| 2012/0266738 A1* | 10/2012 | Evans et al. | 84/609 |
| 2013/0036897 A1* | 2/2013 | Parks | 84/483.2 |
| 2013/0065656 A1 | 3/2013 | Parks | |
| 2014/0033899 A1* | 2/2014 | Dripps et al. | 84/483.1 |

FOREIGN PATENT DOCUMENTS

| | | |
|---|---|---|
| WO | WO 01/95052 | 12/2001 |
| WO | WO 2006/042358 | 4/2006 |
| WO | 2008/103269 A1 | 8/2008 |
| WO | 2012/125763 A2 | 9/2012 |

OTHER PUBLICATIONS

PCT/US 08/01965, Written Opinion, Jun. 9, 2008 (6 pgs).
PCT/US 08/01965 International Preliminary Report dated Sep. 3, 2009 (2 pgs).
PCT/US12/29123, International Search Report; dated Jun. 20, 2012 (2 pages).
PCT/US12/29123, Written Opinion, dated Jun. 20, 2012 (5 pgs.).
Miracle Piano Teaching System, from Wikipedia, 1990; http://en.wikipedia.org/wiki/Miracle_Piano (2 pgs).
Miracle Piano Teaching System, Nintendo Entertainment System User's Guide, 1990; 1991 The Software Toolworks, Inc.; (34 pgs).
Teach Me Piano (formerly Discovering Keyboards), Voyetra Technologies, 1997 (copyright 1996) (2 pgs).
Cakewalk © Pro Audio™ User's Guide Copyright © 1999 (604 pages).
Webpage:http://web.archive.org/web/20070920223307/http://www.seventhstring.com/tuner/tuner.html, dated Sep. 20, 2007 (5 pages).
Webpage: http://web.archive.org/web/20070712092222/http://www.nch.com.au/twelvekeys, dated Jul. 12, 2007 (1 page).
Webpage:http://web.archive.org/web/20080309172950/http://www.owlnet.rice.edu/~elec301/Projects02/realTime/TheProgram.htm, dated Mar. 9, 2008 (1 page).
Webpage: http://marketplace.xbox.com/en-US/Product/Karaoke-Revolution/66acd000-77fe-1000-9115-d8024b4e0803, dated Aug. 27, 2012 (3 pages).
Webpage: http://web.archive.org/20070705093418/http://en.wikipedia.org/wiki/Karaoke_Revolution, dated Jul. 5, 2007 (4 pages).
Webpage: http://web.archive.org/web/20070929061546/http://www.noteworthysoftware.com, dated Sep. 29, 2007 (2 pages).
Webpage: http://web.archive.org/web/20070218101428/http://www.sloud.com/technology/query_by_humming, dated Sep. 27, 2007 (2 pages).
Webpage: http://web.archive.org/web/20070928013629/http:/www.ultrastarstuff.com/ dated Sep. 27, 2007 (2 pages).
Webpage: http://web.archive.org/web/20070809101756/http://www.starplaymusic.com/index.php, dated Aug. 9, 2007 (2 pages).
International Search Report dated Jul. 8, 2010 for PCT application PCT/US2009/065413.
Greg Johnson. www.littleBigStar.net. Games with music instruments/make music by gaming. 2007. Accessed Jul. 5, 2010.
JamOrigin. www.jamorigin.com. Amazing Guitar Recognition Engine. 2010. Accessed Jul. 5, 2010.
Offbeat-Guitarist—The Guide. http://offbeatforum.com/entry.php?2-OFFBEAT-Guitarist-The-Guide.com. 2010. Accessed Jul. 5, 2010.
DJ Hero 101. www.djhero.com. Available at http://www.djhero.com/game/djhero101. Accessed Feb. 3, 2010.
DJ Hero. Wikipedia. Available at http://en.wikipedia.org/wiki/Dj_hero. Accessed Feb. 3, 2010.
Guitar Hero. Wikipedia. Available at http://en.wikipedia.org/wiki/Guitar_Hero. Accessed Feb. 3, 2010.
U.S. Appl. No. 60/902,066 entitled Music video game with stringed instrument input, filed Feb. 20, 2007.

* cited by examiner

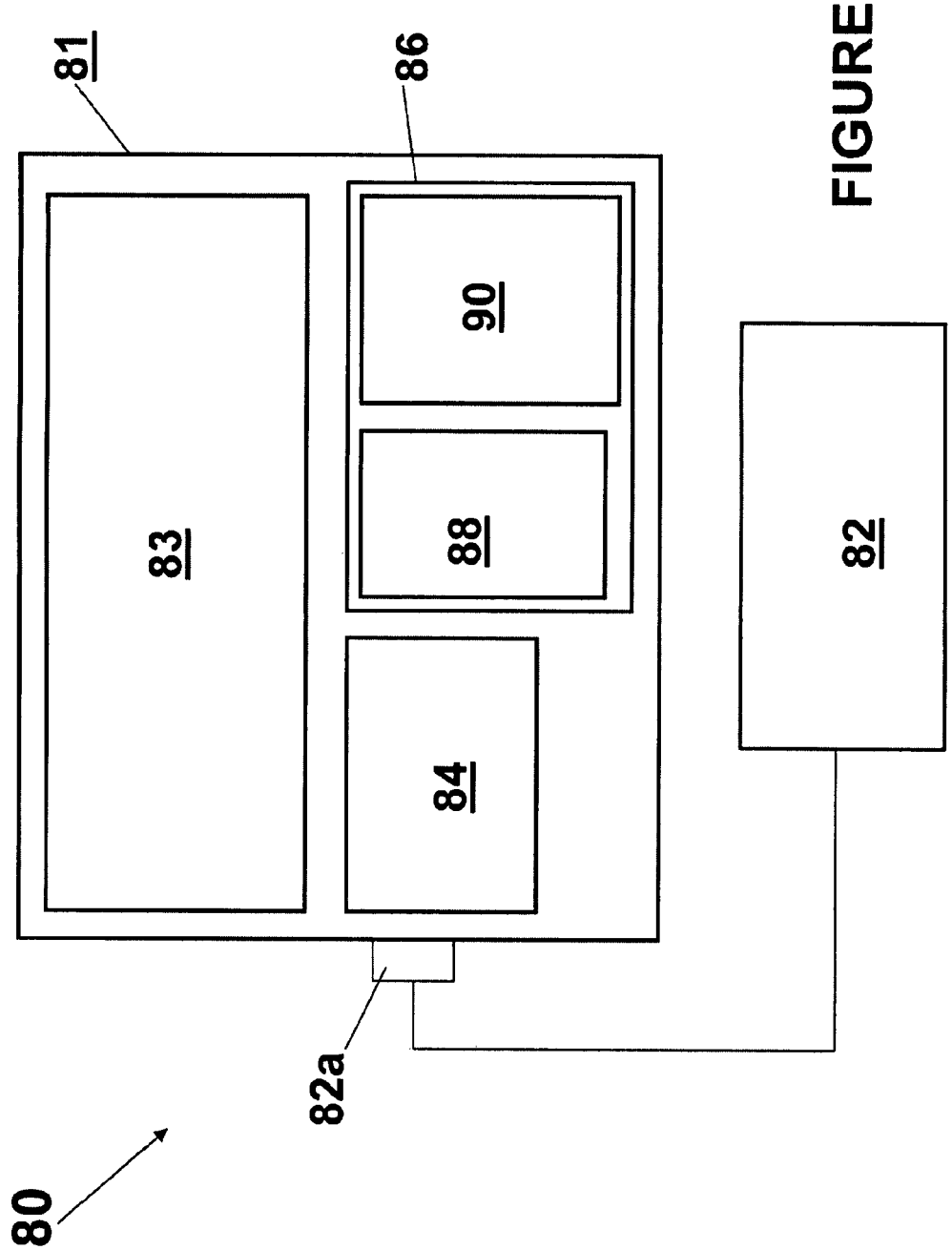

Figure 20  Select Music

INSTRUMENT GAME SYSTEM AND METHOD

PRIORITY CLAIM/RELATED APPLICATIONS

This application is a divisional of and claims priority under 35 USC 120 to U.S. patent application Ser. No. 11/865,681, filed on Oct. 1, 2007 with the title "Instrument Game System and Method", which in turn claims priority under 35 USC 119(e) and 120 to U.S. Provisional Patent Application Ser. No. 60/902,066 filed on Feb. 20, 2007 entitled "A Music Video Game with Stringed Instrument Input" which is incorporated herein by reference.

FIELD

A system and method for game playing is described. In more detail, a system and method for using an instrument as an input to a game and the game with the instrument input is disclosed.

BACKGROUND

Video games generally are well known. In addition, video games and gaming system with music type games are also known. The game systems may be both personal computer/gaming console (Microsoft® Xbox® or Sony® Play Station2®) or stand-alone gaming consoles such as might be in an arcade. Examples of these types of games include Dance, Dance Revolution in which a user attempts to follow a dance routine set to music and is scored based on the accuracy of the user's dance routine to the exemplary dance routine and Guitar Hero in which the user has a controller (that looks like a guitar), plays along with a song and is scored based on how closely the user can play the song as compared to the exemplary song. It is desirable to provide a game system and method in which an instrument is the input controller to the game system and it is to this end that the present invention is directed.

BRIEF DESCRIPTION OF THE DRAWINGS

FIG. 1A illustrates an example of an implementation of a game system;

DETAILED DESCRIPTION OF ONE OR MORE EMBODIMENTS

The game system and method are particularly applicable to a personal computer based, guitar based game system and method with the exemplary user interface described below and it is in this context that the system and method will be described. It will be appreciated, however, that the system and method has greater utility because: 1) the game system can be implemented with other musical or melodic instruments, such as any melodic instrument including, for example, a bass, violin, banjo, piano, voice, clarinet, steel drums, etc.; 2) it can be implemented on other gaming apparatus, such as gaming consoles or stand-alone gaming units (such as the Microsoft® Xbox® system, the Sony® PlayStation®, Nintendo® Wii®, etc.); 3) it can be implemented in peer-to-peer, ASP model, client/server architectures or as an Internet game; and 4) it can be implemented using other user interfaces and features that are not specifically described below in the exemplary embodiments which are provided to illustrate the game system and method. Now, an example of an implementation of the game system to illustrate the functions and principles is described in more detail.

Figure 1B:
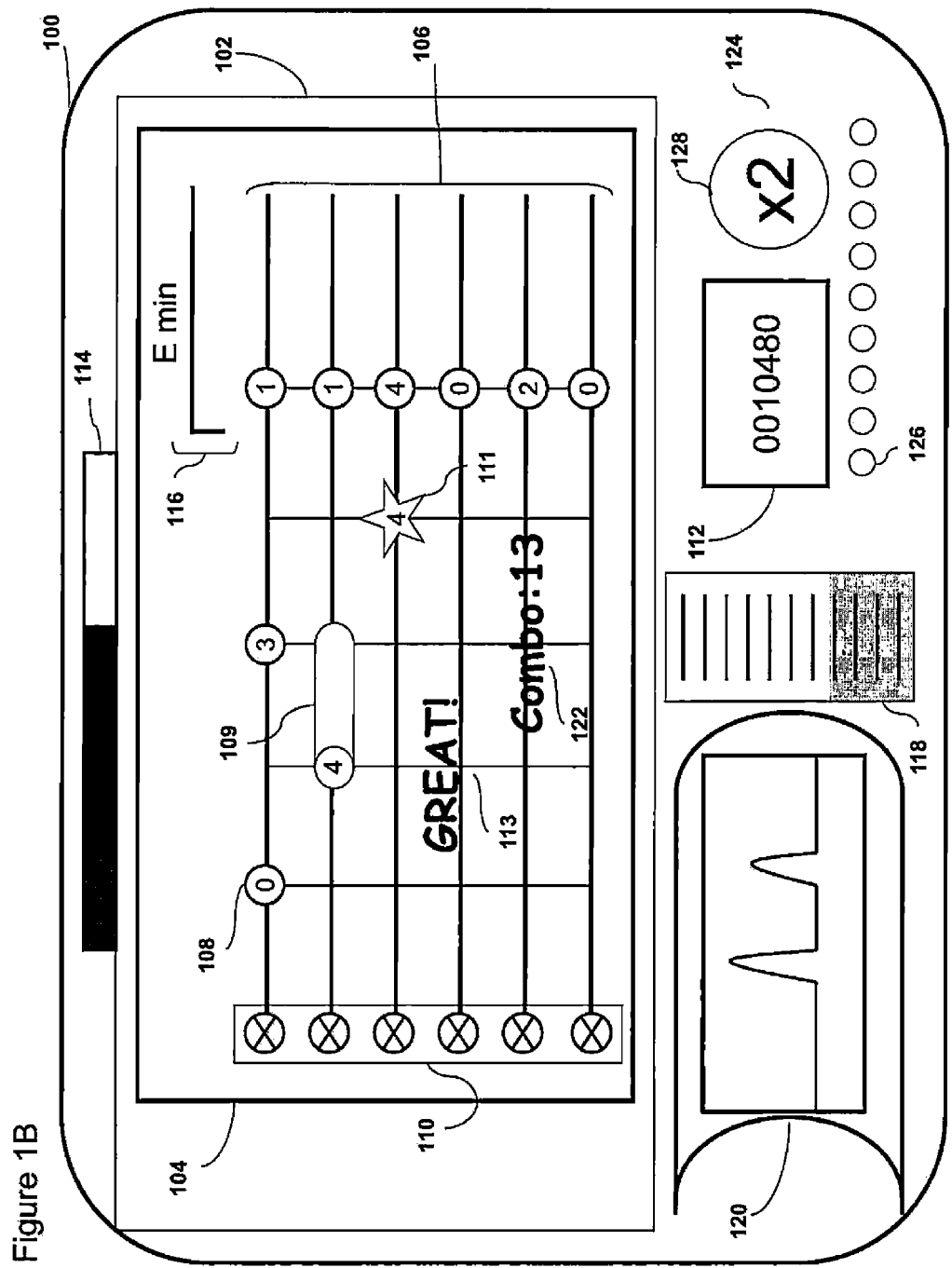
FIG. 1B illustrates an example of a user interface of a stringed instrument example of the game system.

FIG. 1A illustrates an example of an implementation of a game system 80 where the game system is implemented as a software based stand-alone system. The system 80 may include a game unit 81, such as a cabinet or stand-alone unit, and an instrument 82, such as any musical or melodic instruments including, for example, a bass, violin, banjo, piano, voice, clarinet, steel drums, etc., that is used as an input to the game unit 81 via an interface 82a such as a USB cable, amplifier cord with adapter for computer sound card, networking cable carrying musical data information, a microphone, etc. The game unit may include a display 83 that is capable of displaying the user interface of the game to the user (an example of which is described below in more detail with reference to FIG. 1B), one or more processing units 84, a storage unit 86 (that may be a combination of a persistent storage device such as a hard disk drive, ROM, etc.), and a memory such as SRAM or DRAM, and an operating system 88 that controls the operation of the game system and a game module 90 that reside in the storage unit. The game module, in this embodiment, may be a plurality of lines of computer code. In other embodiments, the game module may also be implemented in hardware or a combination of hardware and software. The game module may include modules for game administration (level difficulty functions), musical instrument interface and game scoring. When the game system is active, the game module is loaded into the memory and then executed by the one or more processing units to implement the functions and operations of the game system described in more detail below. The game system permits a user to play an instrument along with an arrangement displayed on the display (use the instrument as an input to the game system using the interface) and then scores the user based on the accuracy with which the user plays the arrangement shown on the display as described in more detail below.

Figure 2:
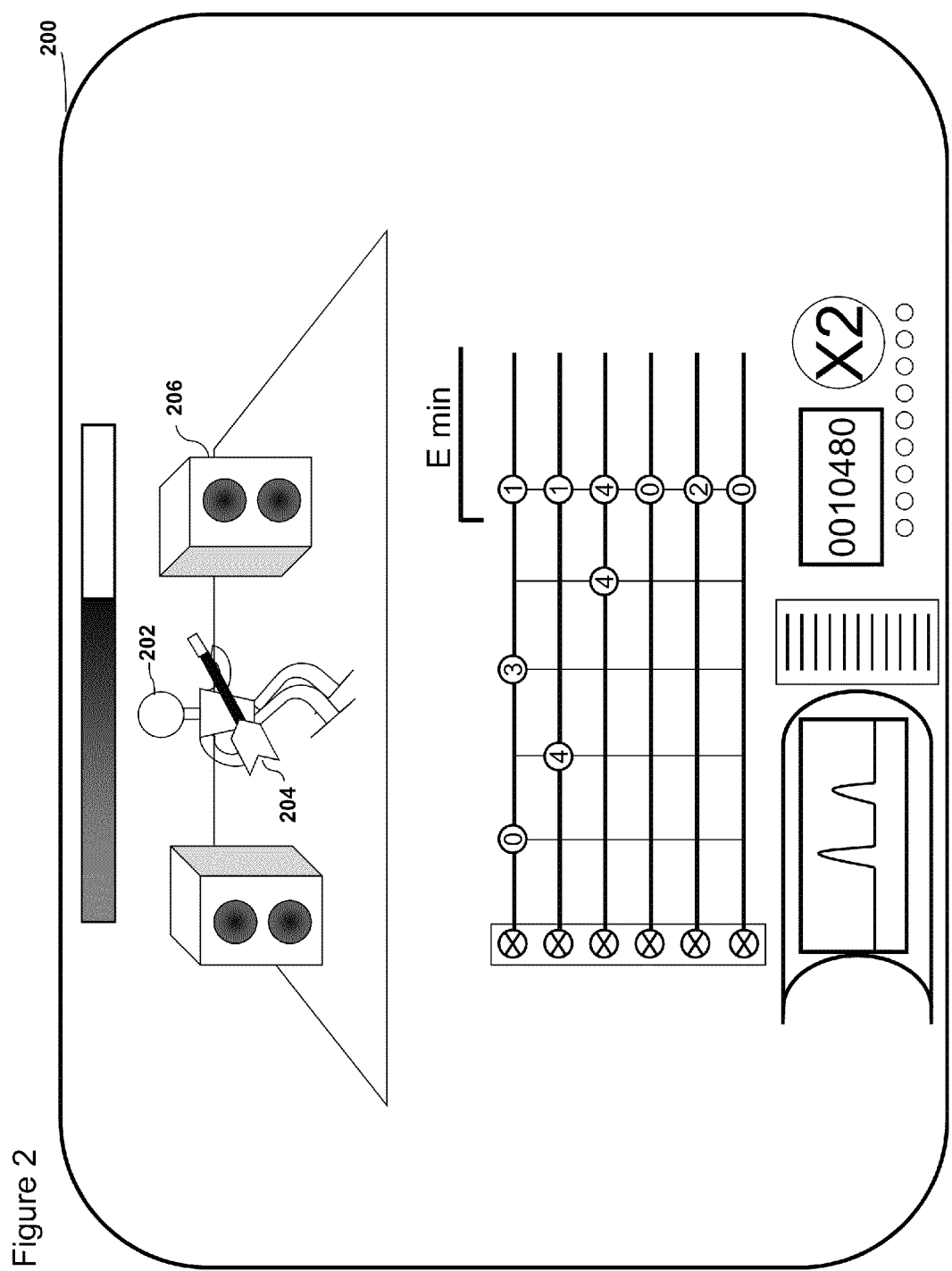
FIG. 2 illustrates an example of a user interface of a stringed instrument example of the game system.

FIG. 1B illustrates an example of a user interface 100 of a stringed instrument example of the game system. The example of the user interface is for illustration purposes only and the game system may use other user interfaces and the game system is not limited to any particular user interface design. The example user interface may include a background graphics 102 that may consist of a number of images or a virtual environment and may be two dimensional or three dimensional. An example of a two dimensional background graphic with a single image (i.e. wallpaper) or a series of images (i.e. a movie, animation, music video, etc.) is shown in FIG. 1B. FIG. 2 shows another embodiment of a user interface 200 that is three dimensional and may include an animated character or characters 202 possibly playing a virtual instrument 204 and surrounded by virtual props 206 (audio equipment, stage, audience, etc.).

Figure 3A:
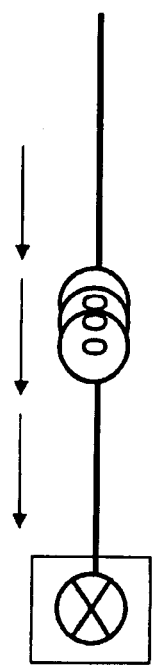
FIGS. 3A and 3B illustrate examples of the user interface of a note moving toward the play area of the stringed instrument example of the game system.
Figure 3B:
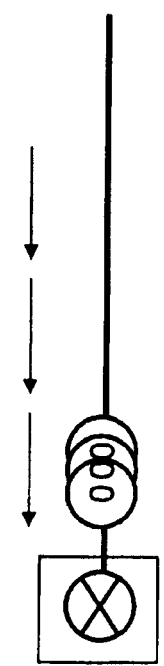

Returning to FIG. 1B, the exemplary user interface may further include an action indicator interface 104 that may include a note field 106, one or more notes 108 superimposed on top of the note field 106 and a play area 110. In one embodiment of the game system, the horizontal position of a note in the action indicator interface 104 indicates the time to play the note (cue time), the vertical position of the note indicates the string to play it on (cue string), and the number inside each note indicates the fret that is to be pressed down (cue fret) on the string to generate the correct pitch. In the one embodiment, the one or more notes 108 move horizontally towards the play area 110 and the play area 110 is stationary. FIGS. 3A and 3B show this horizontal motion of the notes relative to the play area 110 with FIG. 3A is at an earlier time than FIG. 3B. In the game system, the action indicator interface 104 cues the user to play the appropriate note at a specific time. When the overlap of the note and the play area occur, the user is to play the appropriate note.

Figure 3C:
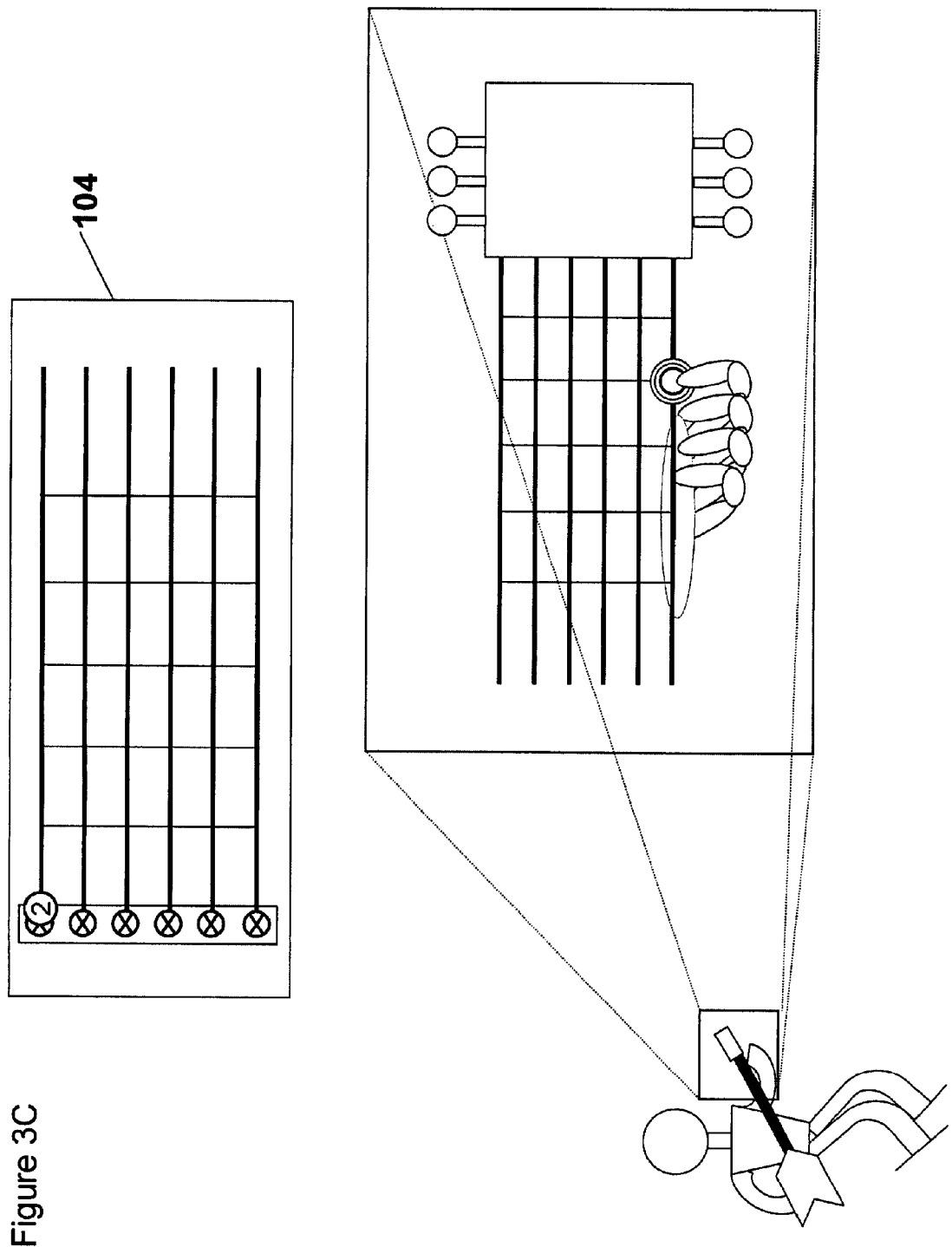
FIG. 3C illustrates another example of the user interface of FIG. 1B.

FIG. 3C illustrates the expected user response to the action indicator interface 104. The top row of the user interface corresponds to the user playing the bottom string on a guitar (cue string). The number inside the note corresponds to the user holding down a particular fret of a guitar, such as the $2^{nd}$ fret, with his/her finger (cue fret). The overlap of the note with the play area indicate that the user should play the cue string with the cued fret pressed at that instance (cue time), therefore producing a note that would match the arrangement note if played correctly and played at the correct time.

Figure 4:
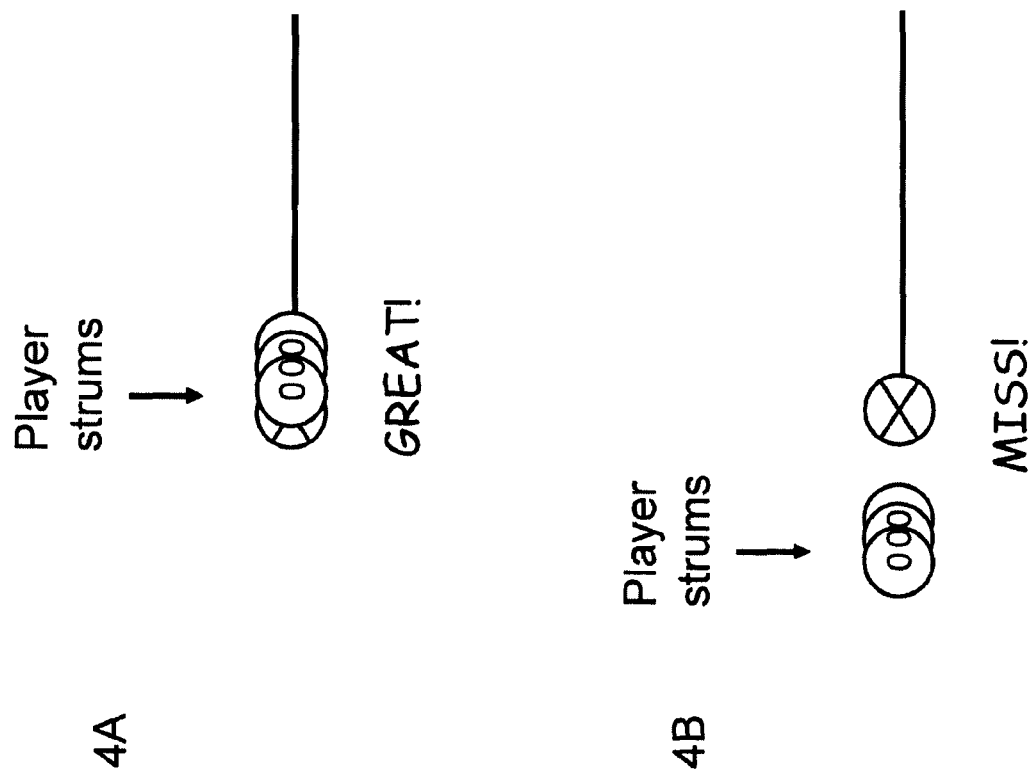
FIGS. 4A and 4B illustrate an example of a hit event and a miss event of the stringed instrument example of the game system.

If the user plays the cued note at the cued time, a "Hit" is awarded. If the user does not play the cued note, or waits too long to play the cued note, a "Miss" is awarded. FIGS. 4A and 4B shows a hit event (when the user plays the correct note at the correct time) and a miss event (when the user fails to play the correct note at the correct time), respectively. In some embodiments of the game system, if the note is judged as a "Hit", the note graphical symbol may change its appearance (i.e. glow, explode, turn bright color, etc.), otherwise, if the note is judged as a "Miss", the graphical symbol for the notes may change its appearance differently (i.e. fade out, shrink, turn dark color, etc.).

In some embodiments of the game system, the user interface 100 shown in FIG. 1B may show different size and/or length notes 108 wherein the size and/or length of a note shows the player how long to hold the note with note 108 illustrating a "short note" and note 109 illustrating a "long note".

In some embodiments of the game system, a note 111 may take on a special characteristic (i.e. glowing star, blinking, moving in a wavy path) from other notes in the note field 106 and may be "hit" by the user (played correctly) for an additional score or otherwise enhance the player's in-game status. In some embodiments, the judgment of the last played note is displayed on-screen in a textual format 113 for the player to receive immediate feedback of the played note. The judgment 113 may read "Great", "Good", "Fair", "Poor", "Miss", etc.

The action indicator interface 104 of the game system may be modified in various ways in other embodiments of the game system. For example, each note 108 (shown as a circle in the example in FIG. 1B) may use another graphical representation (i.e. squares, stars, arrows, etc.)

Figure 5:
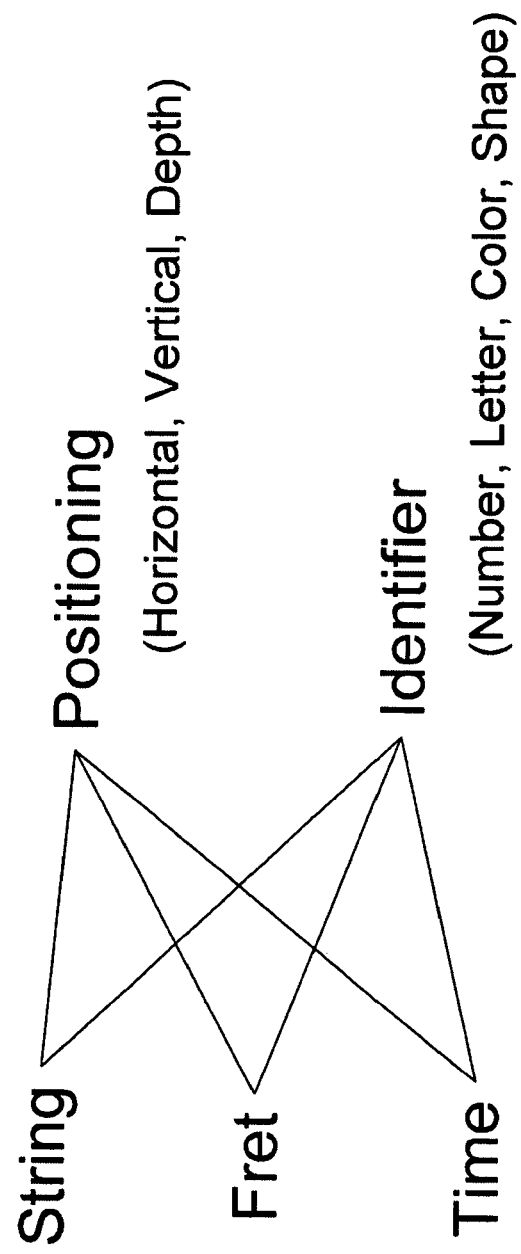
FIG. 5 illustrate an example of the string, fret and time variables of the stringed instrument example of the game system.
Figure 6A:
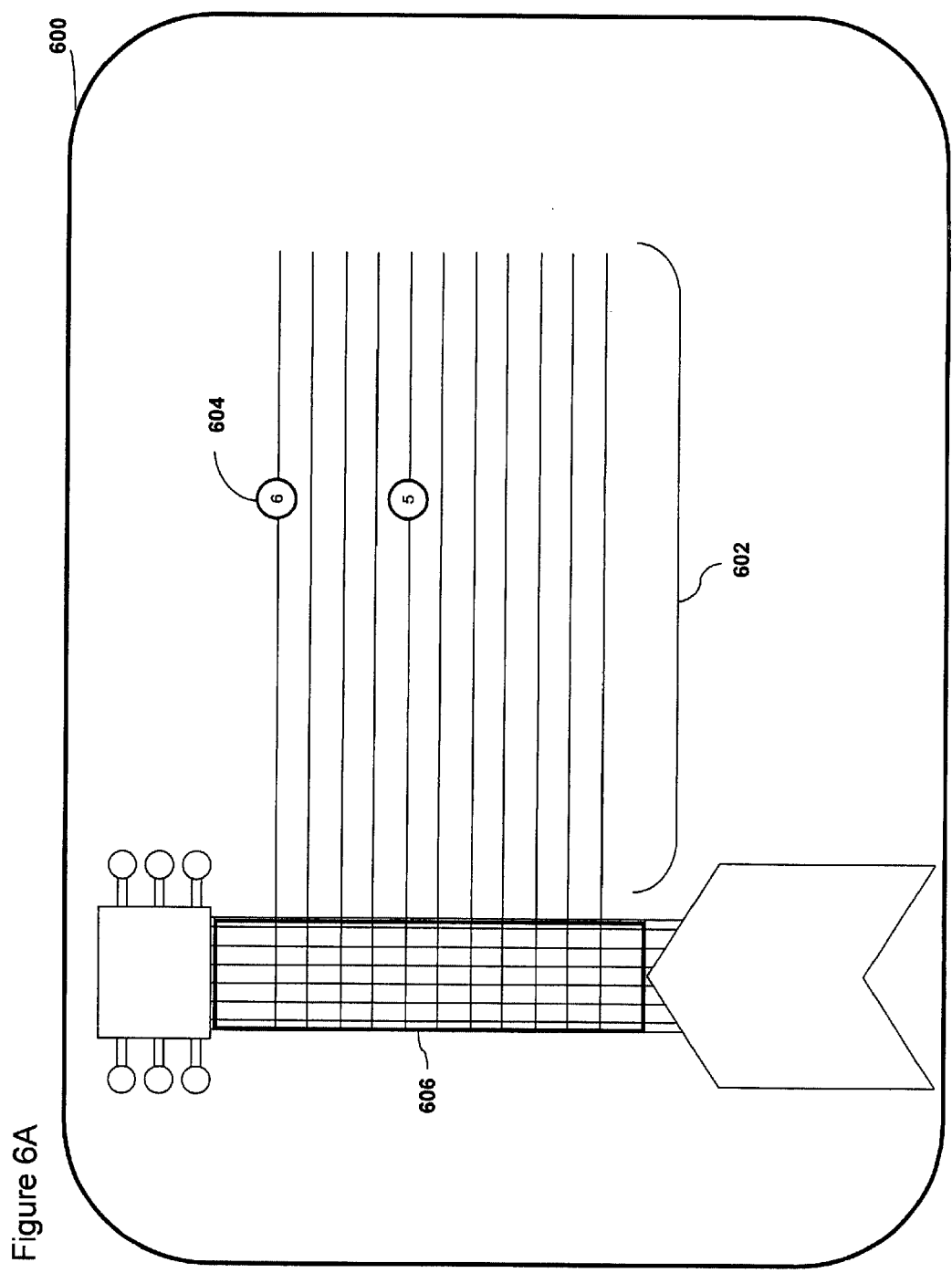
FIG. 6A illustrates an example of an action indicator interface of the stringed instrument example of the game system.
Figure 7:
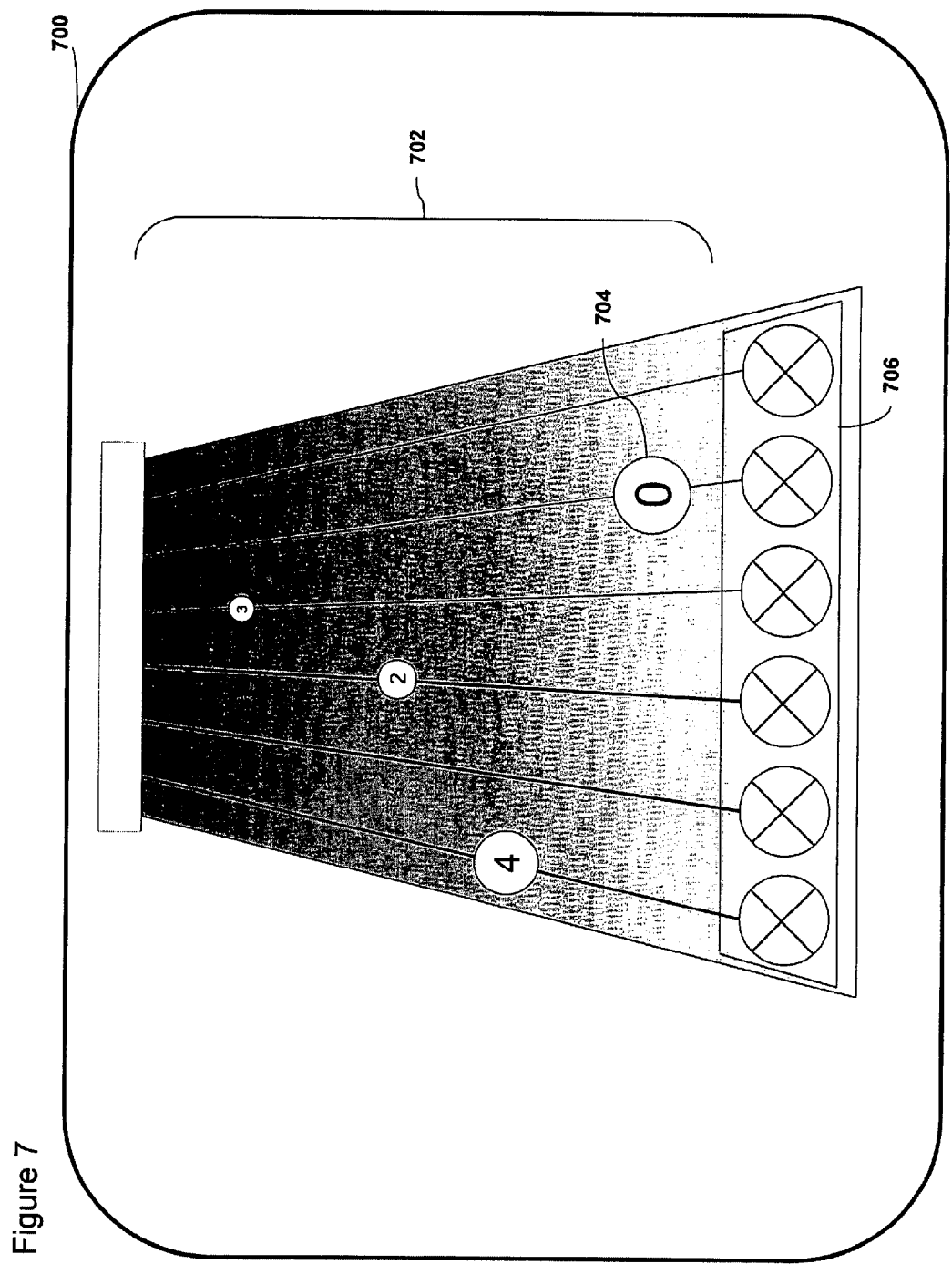
FIG. 7 illustrates an example of another action indicator interface of the stringed instrument example of the game system.
Figure 8:
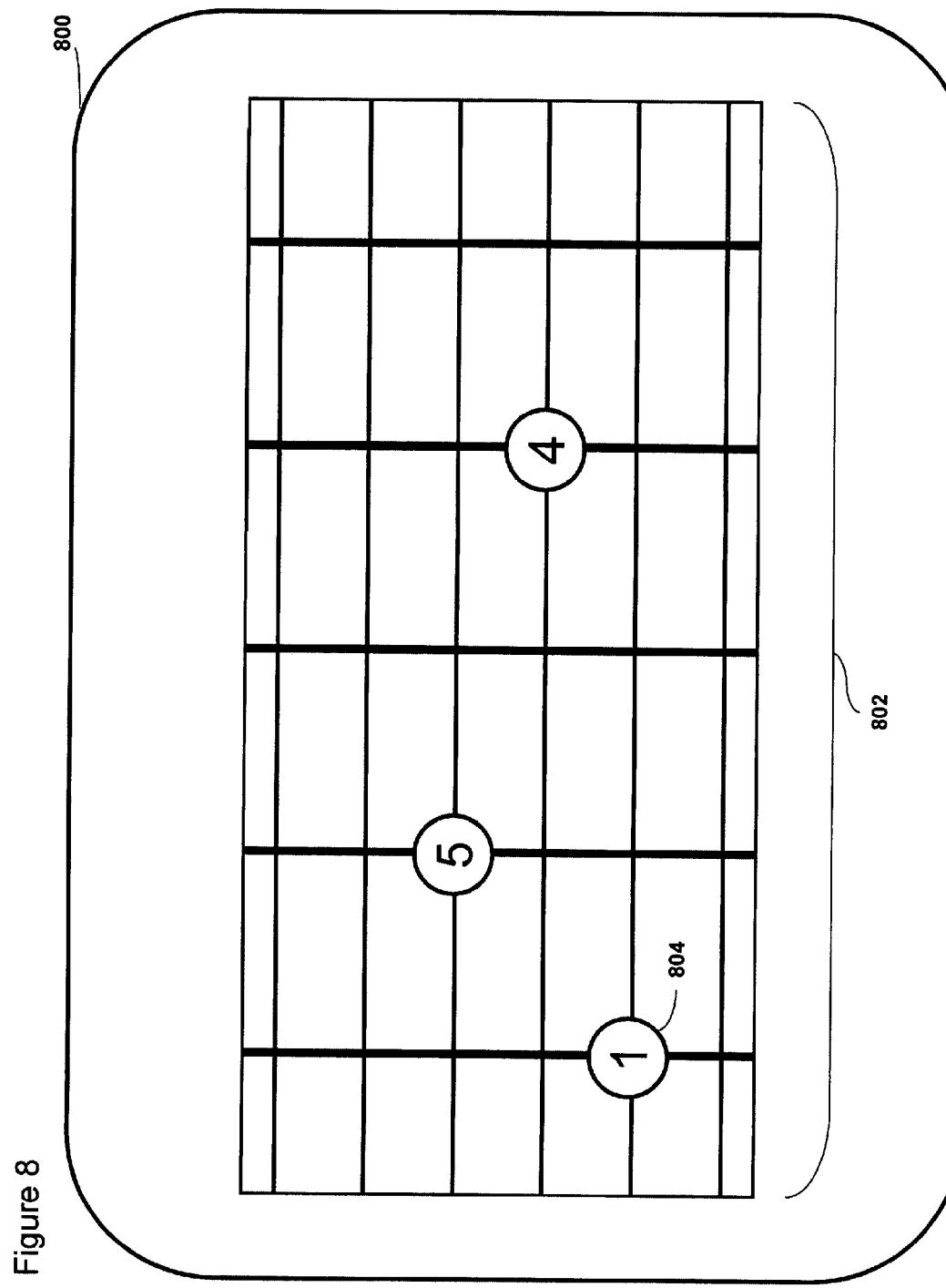
FIG. 8 illustrates yet another example of an action indicator interface of the stringed instrument example of the game system.
Figure 9:
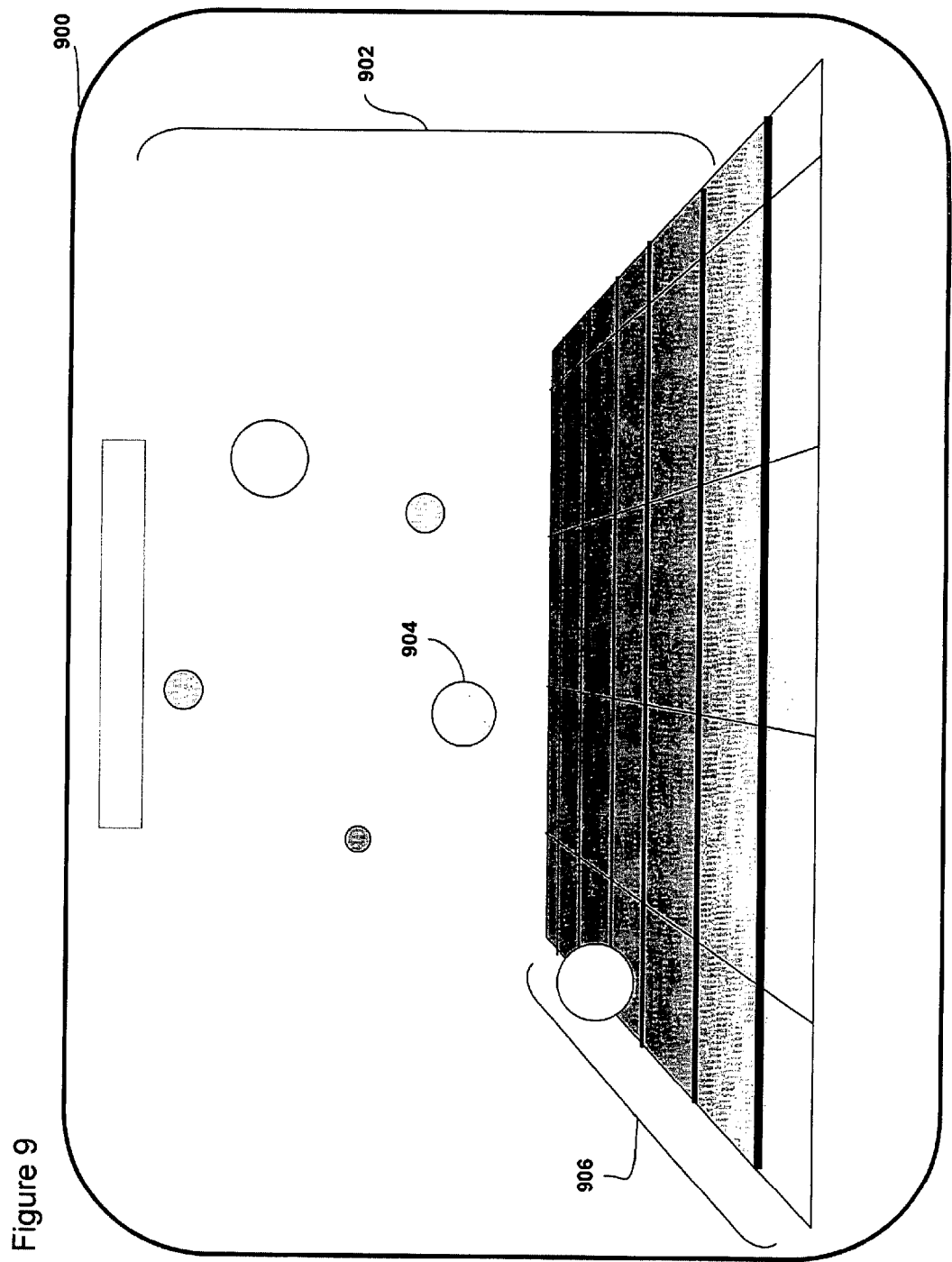
FIG. 9 illustrates yet another example of an action indicator interface of the stringed instrument example of the game system.

As another example, the horizontal position of the note indicating the time to play it (cue time), the vertical position indicating the string to play it on (cue string), and the number inside the note indicating the fret that is to be pressed down (cue fret) on the string to generate the correct pitch is an example of the user interface that may be used to cue the stringed musical instrument play and the variables that cue the play (which string, which fret, and what time), may be arranged spatially (horizontally spaced, vertically spaced, depth-wise spaced) and demarcated by notation (using numbers, letters, colors, shapes, etc) and may have many permutations as shown in FIG. 5. Examples of these different user interfaces are shown in FIGS. 6A-9. FIG. 6A shows an embodiment of the action indicator interface 104 with a note field 602, one or more notes 604, and a play area 606 wherein the horizontal position of the note indicates the cue time, the vertical position of the note represents the cue fret, and the number inside the note represents the cue string. FIG. 7 shows another embodiment of the action indicator interface 104 with a note field 702, one or more notes 704, and a play area 706 wherein the depth-wise position of the note indicates the cue time, the horizontal position indicates cue string, and the numbers inside the notes represent the cue fret. FIG. 8 shows another embodiment of the Action Indicator Interface 100 with a note field 802 and one or more notes 804 in which the horizontal position represents cue fret, the vertical position represents cue string, and the numbers inside the notes represent the cue time (i.e. the number of seconds to wait before playing the appropriate string/fret combination). Finally, FIG. 9 shows another embodiment of the action indicator interface 104 with a note field 902, one or more notes 904, and a play area 906 in which the horizontal position represents the cue fret, the depth-wise position represents the cue string, and the vertical position represents the cue time (i.e. when to play the note depends on how fast the note falls and the string/fret combination cued by where the note falls in the play area). Any of the embodiments shown in FIGS. 1-9 may be further modified by using unique colors, characters, or shapes instead of numbers to cue the appropriate string/note/time. For instance, the six colors of red, green, blue, cyan, yellow, and magenta can be used to demarcate the cue string on a 6 string guitar. Also, for instance, the characters of the note may be used to demarcate the cue note (i.e. "C#", "D", "B flat", etc.) In addition to spacing along the traditional axis (i.e. horizontal, vertical, depth-wise), additional embodiments may space along non-traditional axes (i.e. diagonal). Additionally, there is no requirement that any or all axes be orthogonal (i.e. two axes may be parallel, near parallel, or otherwise not angled at 90 degrees).

Figure 10:
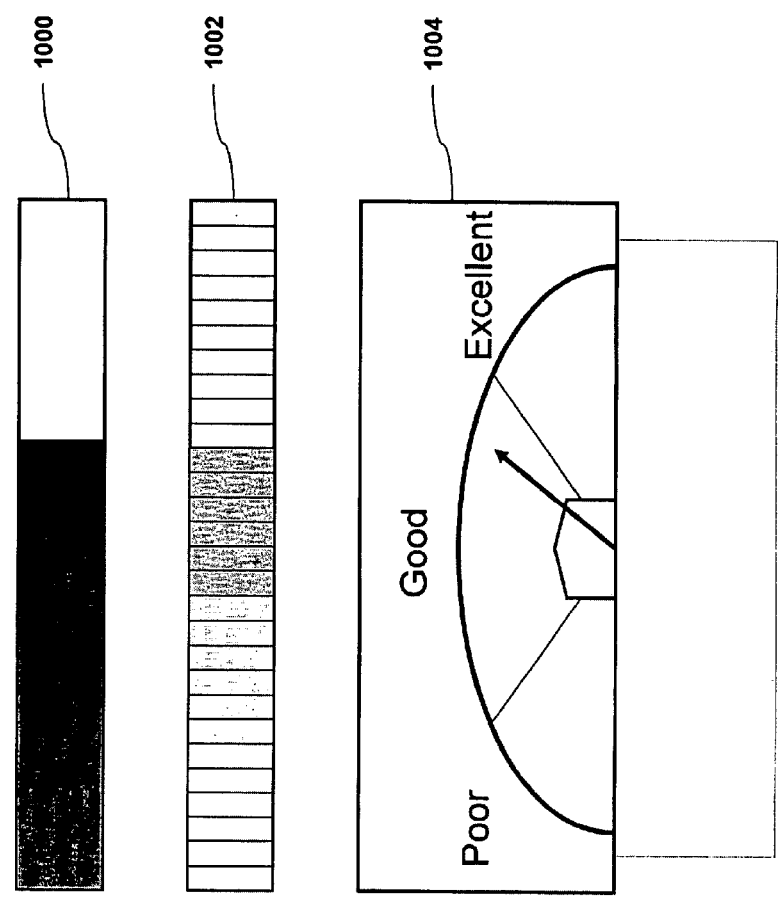
FIG. 10 illustrates an example of a performance meter user interface of the stringed instrument example of the game system.

The game system user interface may also include, in some embodiments, a performance feedback interface and several components of the user interface 100 may loosely define a mechanism for a player to receive feedback on their performance in the game. In some embodiments, the user interface 100 may include a score window 112 or other graphic that is used to present the player's current score during their performance. In some embodiments, a performance meter 114 may also be used to present the player's current performance which is a measure of the number of hit notes and missed notes and, if the player's performance falls below a predetermined level, the game may end. FIG. 10 shows alternative embodiments of performance meters. In some embodiments, the performance meter is a bar graph filled or unfilled with colors or patterns based on the player's performance, shown by 1000/1002 in FIG. 10. In some embodiments, the performance meter resembles an analog meter, where the needle moves up and down to indicate the player's performance, shown by 1004 in FIG. 10.

The user interface 100 of the game system in some embodiments may further comprise a chord track 116 that may be, for example, located above the note field 106. During game play, chord information appears in the chord track 116 and scrolls from right to left towards that stationary play area 110. Each piece of chord data lines up with a corresponding note(s) 108 in the note field 106 to show the association between the two.

The user interface 100 of the game system in some embodiments may further comprise a signal feedback interface wherein several components in the user interface 100 loosely define a mechanism for the player to receive the quality and power of the instrument signal being fed into the game. In some embodiments, a volume meter 118 shows the total volume of the player's instrument during instrument play. In some embodiments, a signal plot 120 shows a plot of the power of the player's signal vs. the note so that the signal plot will show peaks at the tone(s) the player is playing.

The user interface 100 of the game system in some embodiments may further comprise a combo feedback interface wherein several components in the user interface 100 loosely define a mechanism for the player to receive information on the number of correctly played notes that have been "hit" in a row (i.e. a combo of correct notes). In some embodiments, textual information 122 displays the current combo number. In some embodiments, a combo bar 124 is used, containing a graphical representation of the number of combo notes played together 126, as well as a display of a score multiplier 128 gained because of successful combos.

Figure 11:
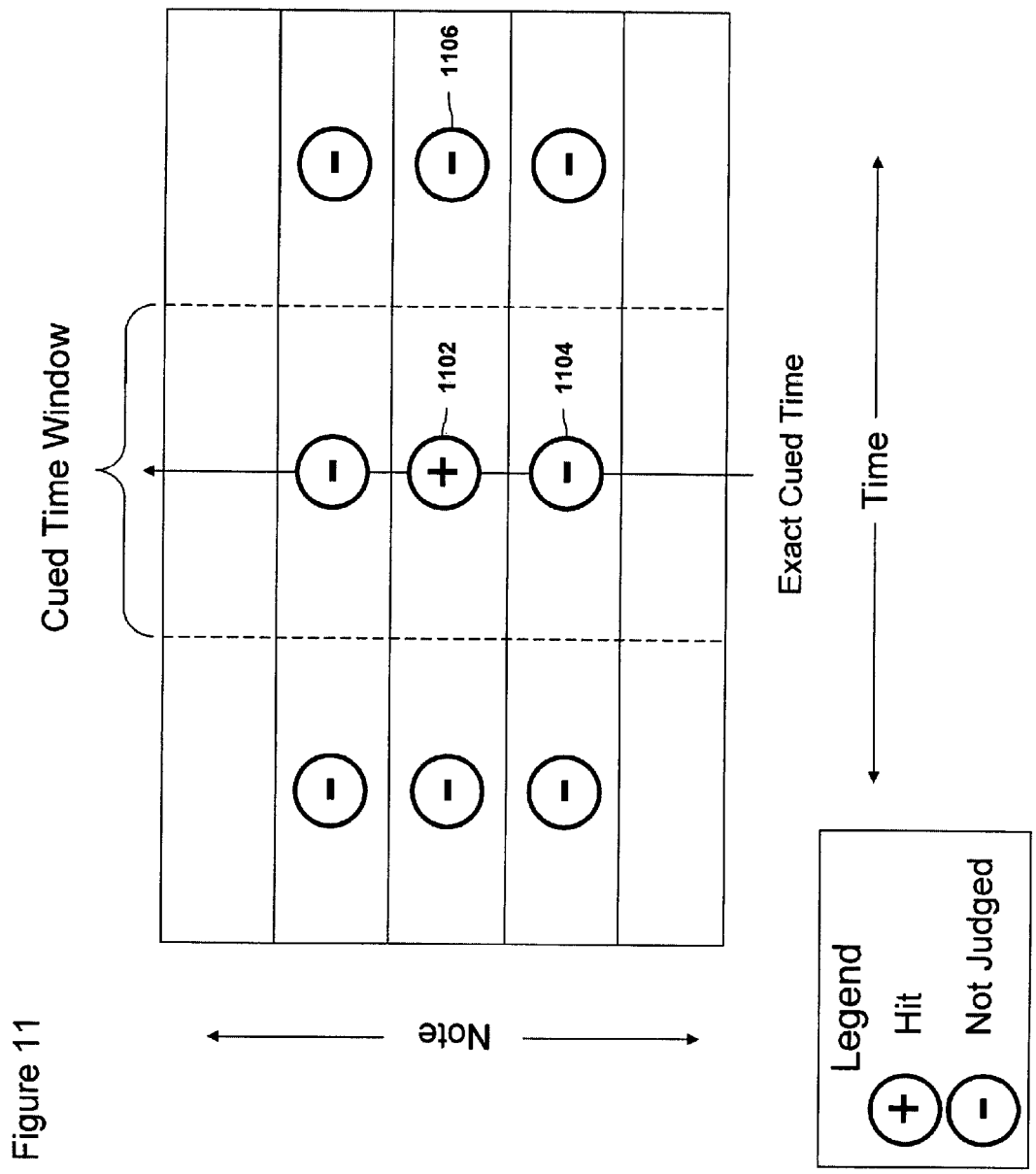
FIG. 11 illustrates a method for scoring notes in the stringed instrument example of the game system.

FIG. 11 illustrates a method for scoring notes in the stringed instrument example of the game system. If the player plays the arrangement note within the time window allotted around the cued time, the arrangement note is scored as a "Hit" (1102). If the wrong note is played (1104), or the arrangement note is played but not within the time window (1106), no judgment is given. Therefore, it is possible for the player to play several wrong notes but still receive a "Hit" after finally playing the correct arrangement note. If the arrangement note is never played, then a "Miss" is scored.

Figure 12:
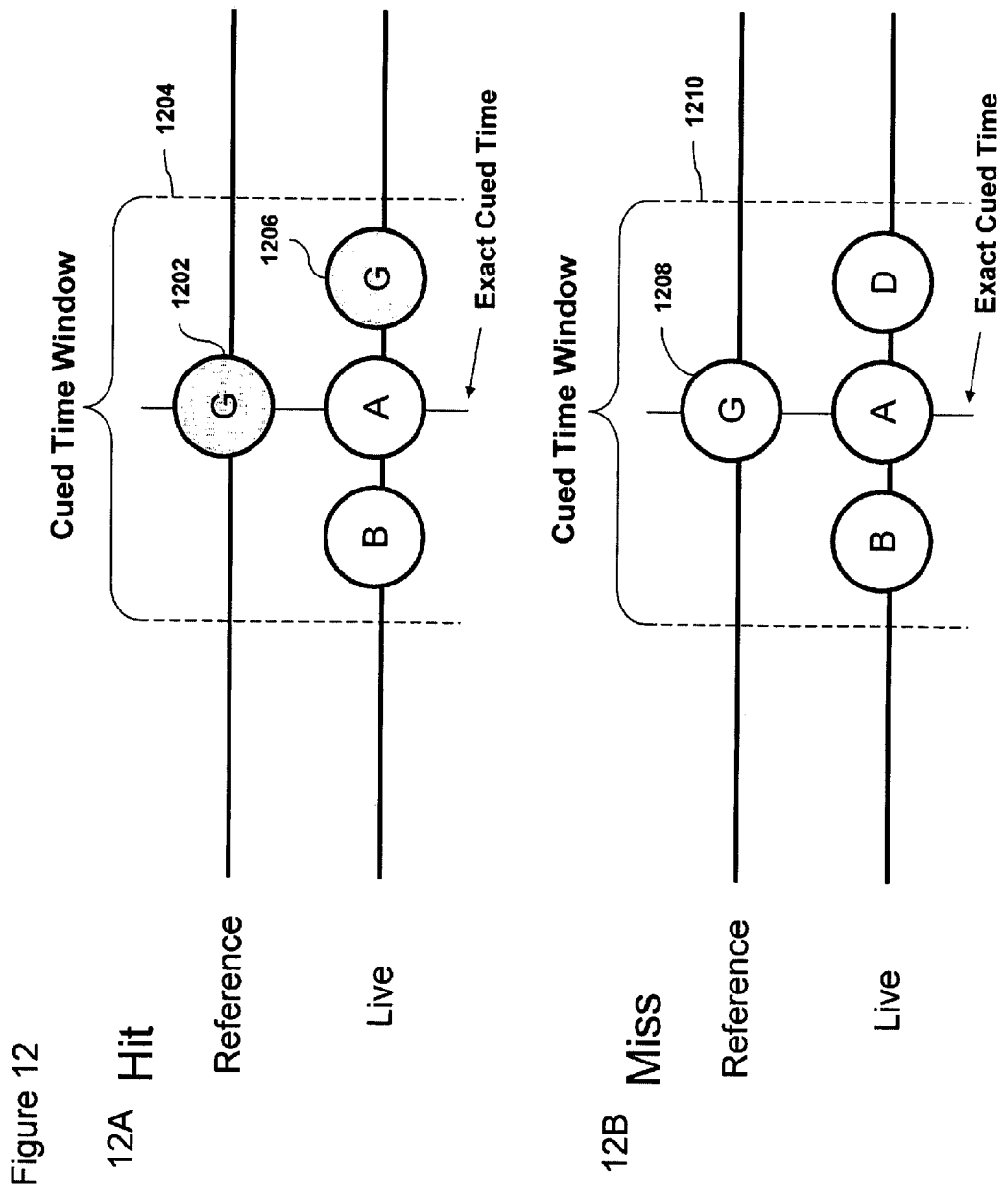
FIGS. 12A and 12B illustrate a hit scoring event and a miss scoring event of the stringed instrument example of the game system.

FIGS. 12A and 12B illustrate a "hit" scoring event and a "miss" scoring event, respectively. As shown in FIG. 12A, the arrangement note "G" has been cued (1202) accompanied by a time window that is shown (1204). A "Hit" is scored in FIG. 12A because the performance by the user contains the note "G" (1206) within the time window (1204). In FIG. 12B, the arrangement note "G" has also been cued (1208) with a time window (1210). However, a "Miss" is scored in FIG. 12B because no note "G" is played in the user performance in the time window. Generally, the live instrument performance of the player will be a continuous signal (with pitches) that therefore is converted in a known manner into notes with time tags so that the game system is able to compare the notes of the arrangement with the notes of the live instrument performance. To accomplish this conversion, the system (such as the analysis module described with reference to FIG. 24 below) may determine the periodicity component of the pitch so that the periodicity component can be converted into a frequency which can then be converted into a note.

Figure 13:
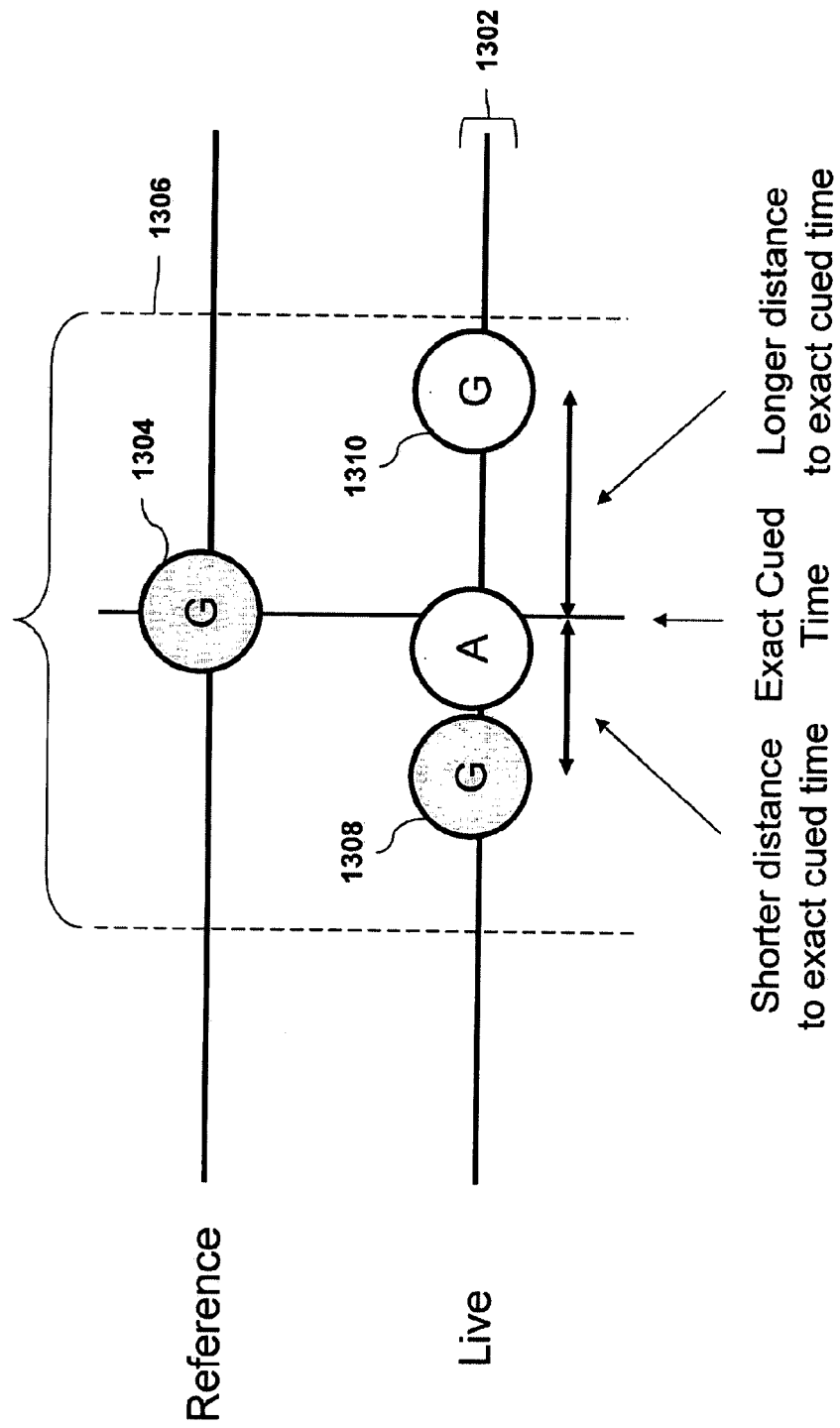
FIG. 13 illustrates an example of a method for scoring the notes of the stringed instrument example of the game system.

FIG. 13 shows which of the performance notes by the user (1302) will be judged/scored if the player plays multiple arrangement notes within the time window. For example, a note "G" in the arrangement has been cued (1304) accompanied by a time window (1306). The player has played "G" twice within the time window (1306), at time 1308 and time 1310. However, time 1308 is closer in time to the arrangement note 1304 and is therefore the one selected for scoring.

Figure 14:
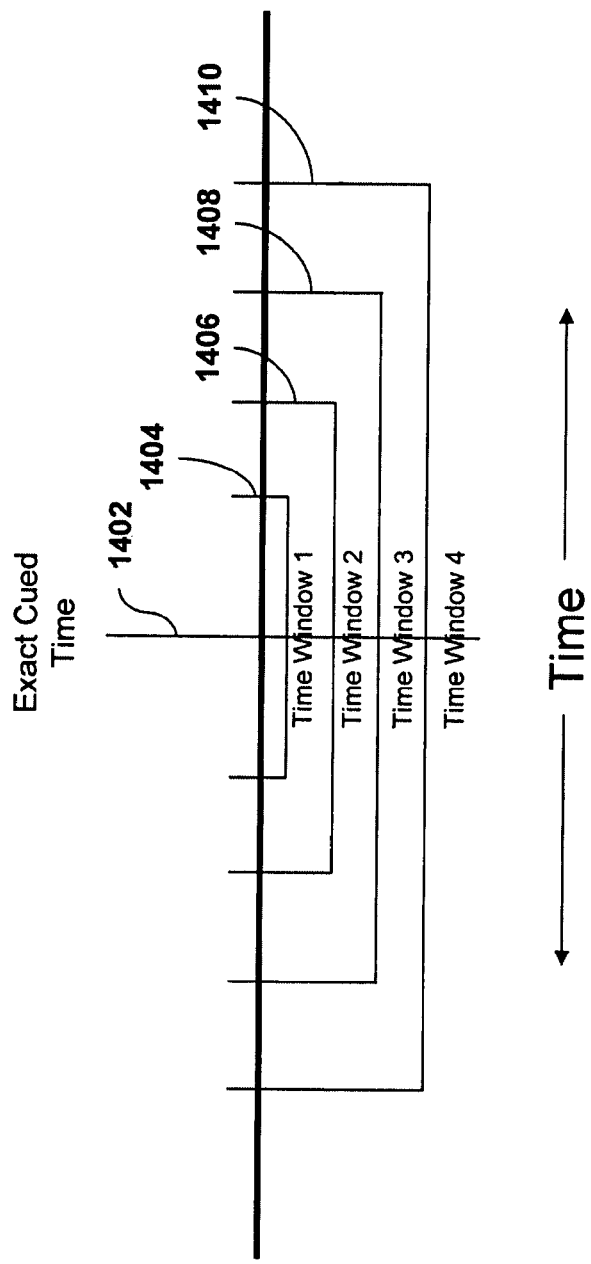
FIG. 14 illustrates an example of the stringed instrument example of the game system in which several time windows are used to score a note.

In some embodiments, there may be several time windows associated with an arrangement note 1402 as shown in FIG. 14 wherein four different time windows are shown. Each time window allows the player a greater time tolerance for playing the correct arrangement note. In some embodiments, the scoring may be done by giving higher scores to the user performance notes that are in the smaller time windows. For instance, 1404, 1406, 1408, and 1410, may be judged as "Great", "Good", "Fair", and "Poor" and be given a score 4, 3, 2, and 1 respectively. Also, there is no requirement that the time window be symmetrical, as more of a window can be given after the exact cued time 1402 that before it, or vice versa.

In some embodiments, the scoring of notes can be done independent of the octave of the note so that notes played that are one of more octaves higher or lower than the cued note will still be scored positively (i.e. a "Hit"). In these embodiments, the note of the live instrument performance data point is adjusted by one or more octaves so that the adjusted note is then compared to the arrangement note. Then, the live instrument performance is scored positively if the adjusted note is equal to the arrangement note and the live musical performance is not scored if the adjusted note does not match the arrangement note.

The game system may include a level scoring module. In the game, each level is scored based on the number of "Hits" vs. "Misses" awarded to the player. In embodiments with multiple time windows, "Hits" would be subdivided further into "Great", "Good", "Fair", "Poor", etc. In some embodiments, scoring for a level is done by the multiplying the number of judged notes by multipliers assigned for each rating (i.e. Miss-0, Poor-1, Fair-2, Good-3, Great-4). In some embodiments, a score above a certain amount will unlock one or more unlocked items (i.e. a song, a new character, a new character outfit or guitar, etc.). In some embodiments, a score below a certain amount will "fail" the player and thus not allow the player to progress to the next level.

Figure 15:
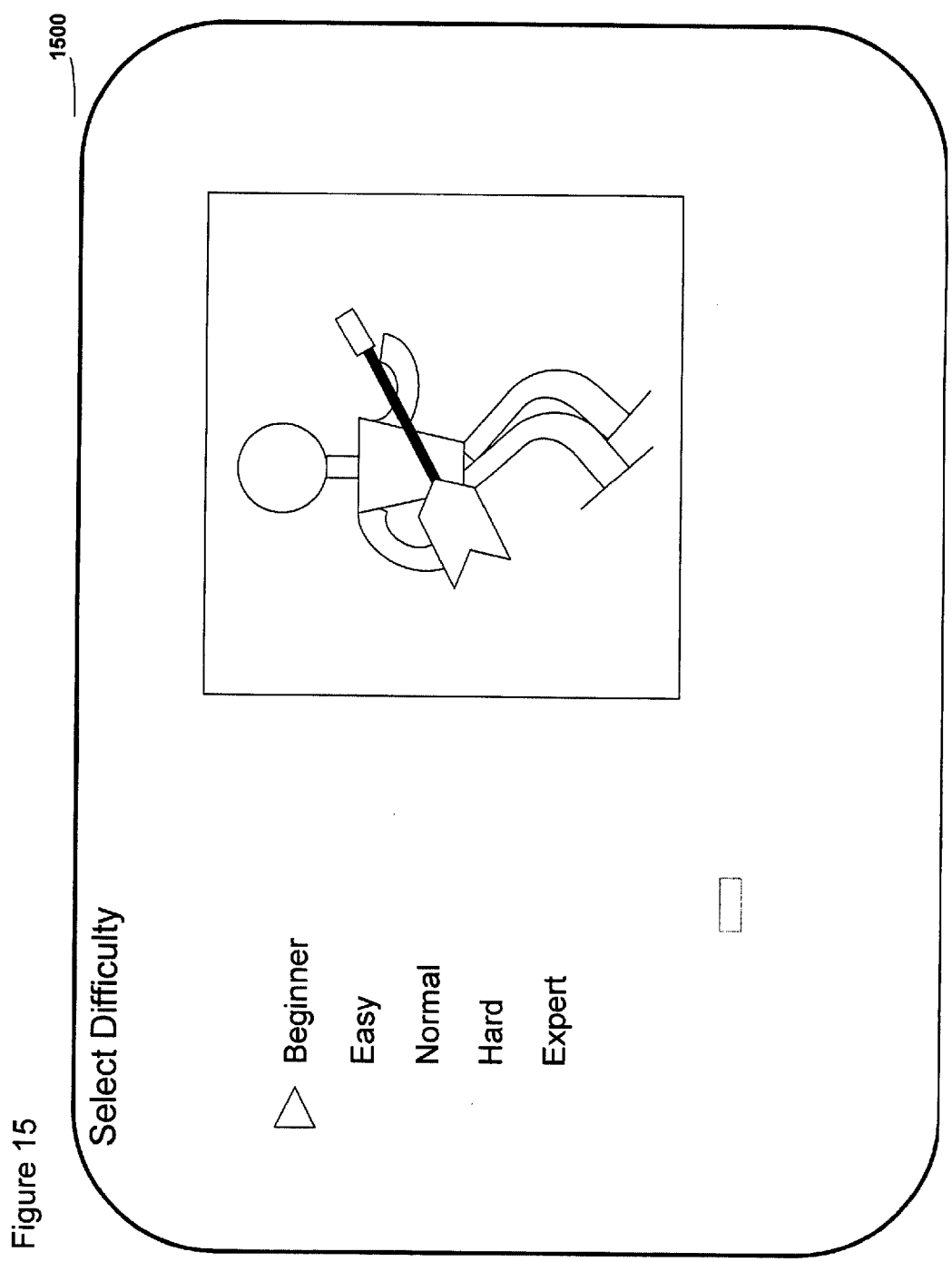
FIG. 15 illustrates an example of the user interface for selecting a level of difficulty of the stringed instrument example of the game system.

The game system may also adjust the difficulty of each level of the game. For example, as shown in FIG. 15, the same song may be played with several different level difficulties using a select difficulty screen 1500.

Figure 16:
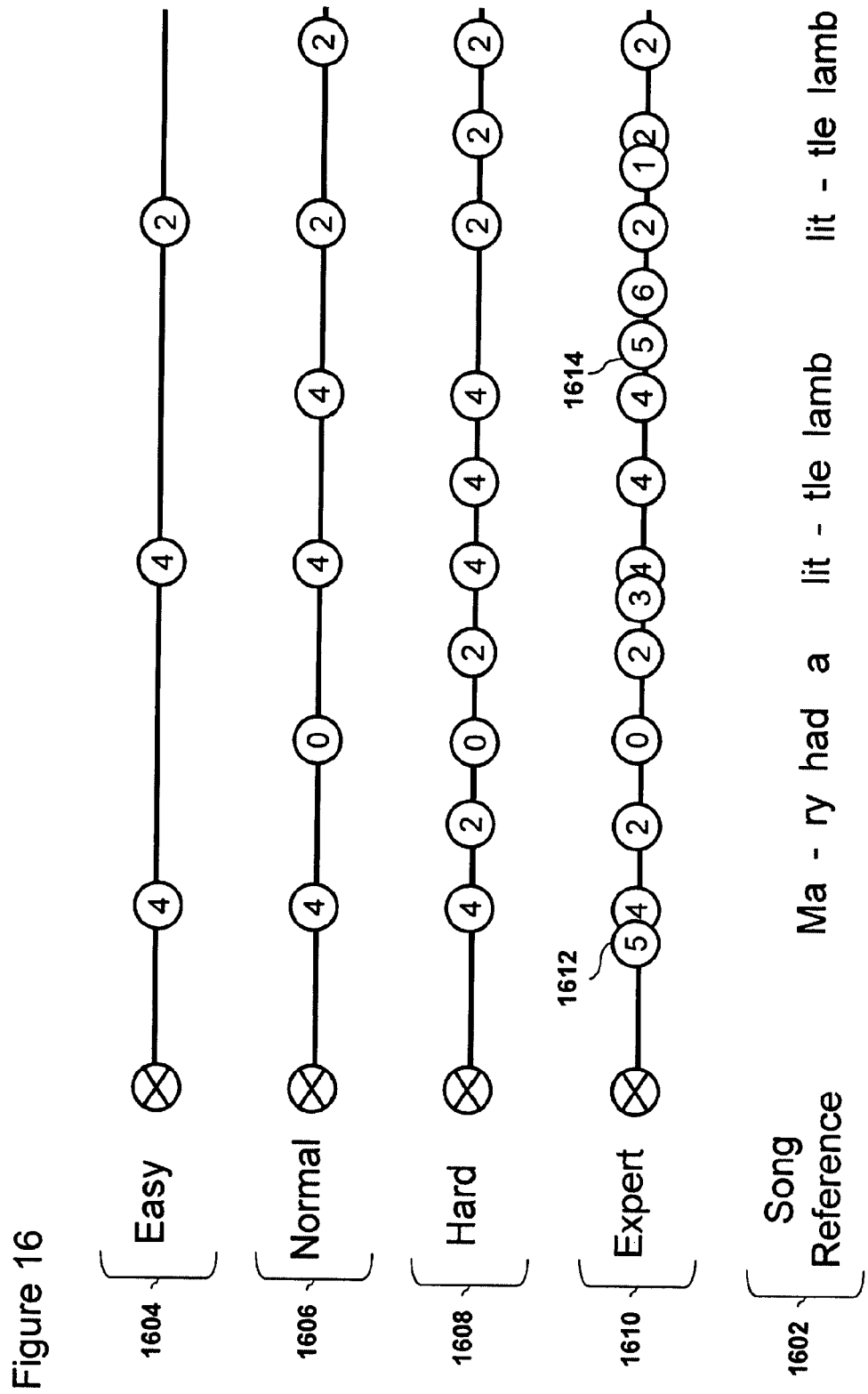
FIG. 16 illustrates examples of a sequence of notes with different difficulty levels in the stringed instrument example of the game system.

In the game system, different arrangements of musical pieces can be used to give more difficult and challenging experiences of playing the same musical piece, as shown by FIG. 16. The piece shown, "Mary Had a Little Lamb", has its rhythmic components shown by 1602. An "Easy" arrangement of the piece 1604 may be composed by cueing only every $4^{th}$ note. An arrangement more difficult than the Easy arrangement, denoted as "Normal" 1606, cues only every $2^{nd}$ note. An arrangement more difficult than Normal, denoted as "Hard" 1608, cues the player to play every note in the melody. An arrangement more difficult than Hard, denoted as "Expert" 1610, cues the player to add grace notes 1612 and other extra note runs 1614 to the original musical piece. Furthermore, when the difficulty of an arrangement is made more difficult, the time window for each note may be made smaller than the time window for the note during an easier version of the arrangement.

Figure 17:
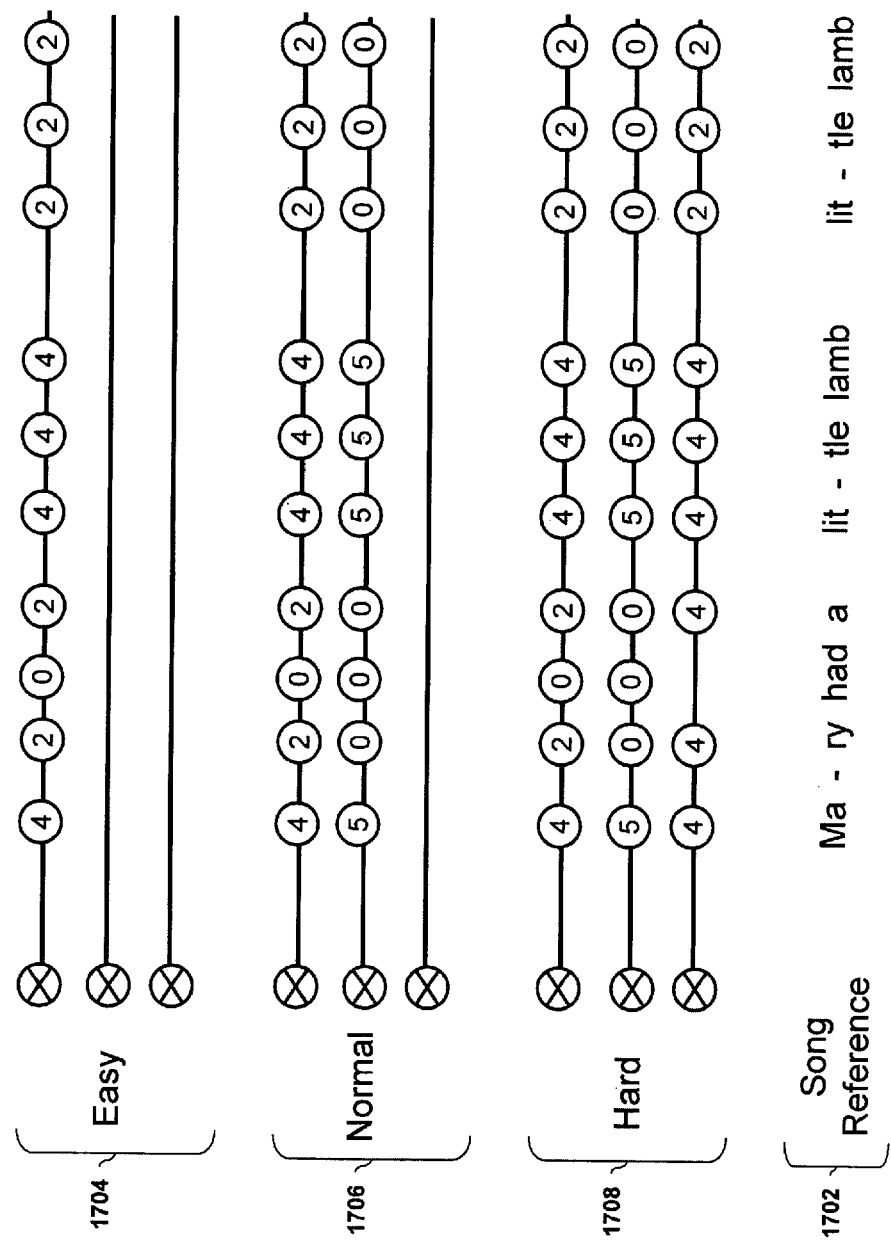
FIG. 17 illustrates examples of another sequence of notes with different difficulty levels in the stringed instrument example of the game system.

An alternate arrangement technique is illustrated in FIG. 17. The piece shown, "Mary Had a Little Lamb", has its rhythmic components shown by 1702. An "Easy" arrangement of the piece 1704 may be composed by cueing every note in the melody. An arrangement more difficult than Easy, denoted as "Normal" 1706, cues additional harmonies to be played on other strings in synchronization with the original melody. An arrangement more difficult than Normal, denoted as "Hard" 1708, cues even more additional harmonies to be played on other strings in synchronization with the original melody. In this way, the difficulty of any arrangement can be adjusted by the game system.

Figure 18:
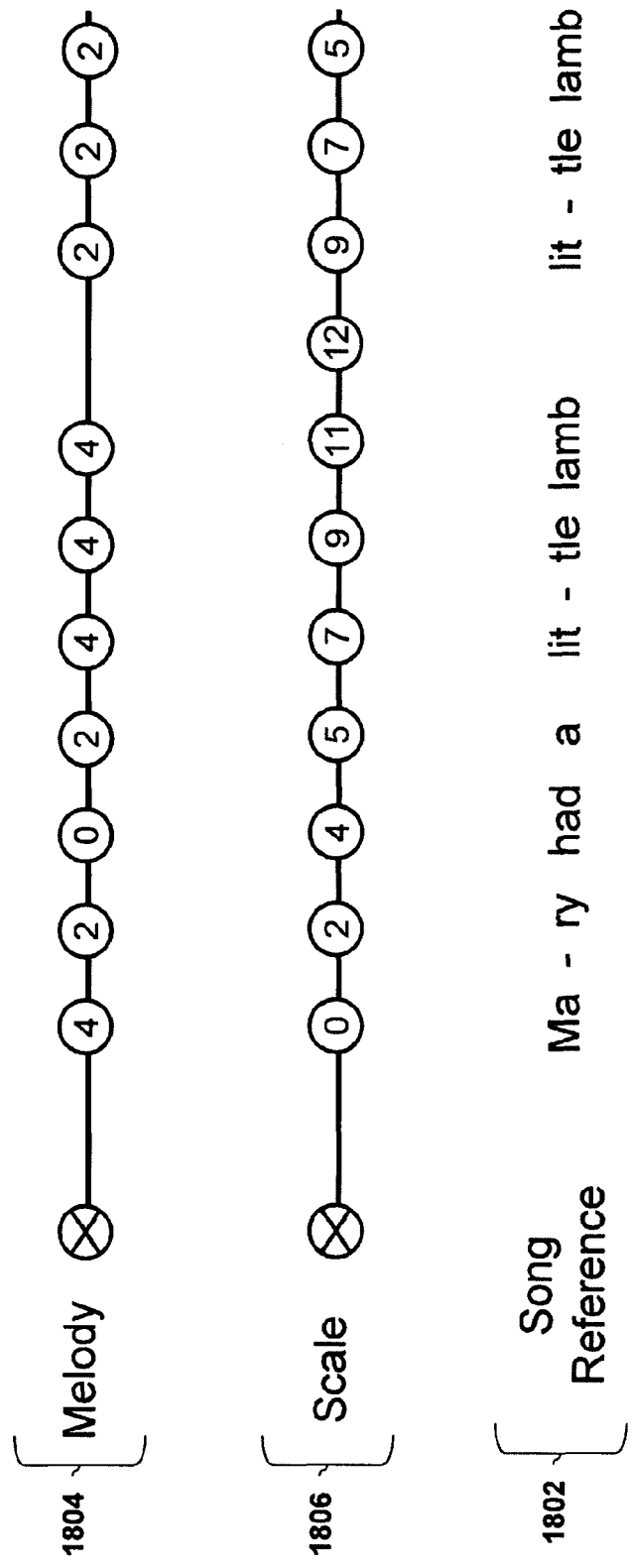
FIG. 18 illustrates an example of an arrangement of a musical arrangement of the stringed instrument example of the game system.

In addition, arrangement of songs do not have to follow the traditional melodies as shown in FIG. 18. In particular, arrangements may be designed where musical theory fundamentals (i.e. scales, chords, arpeggios, etc.) are cued instead. The piece shown, "Mary Had a Little Lamb", has its rhythmic components shown by 1802. While the melody is shown in 1804, an equally valid series of notes consist of a major scale 1806 in the same key as the musical selection. In some embodiments, more difficult arrangements of musical pieces contain a more difficult series of notes to be played together in sequence (i.e. guitar riffs).

Figure 19:
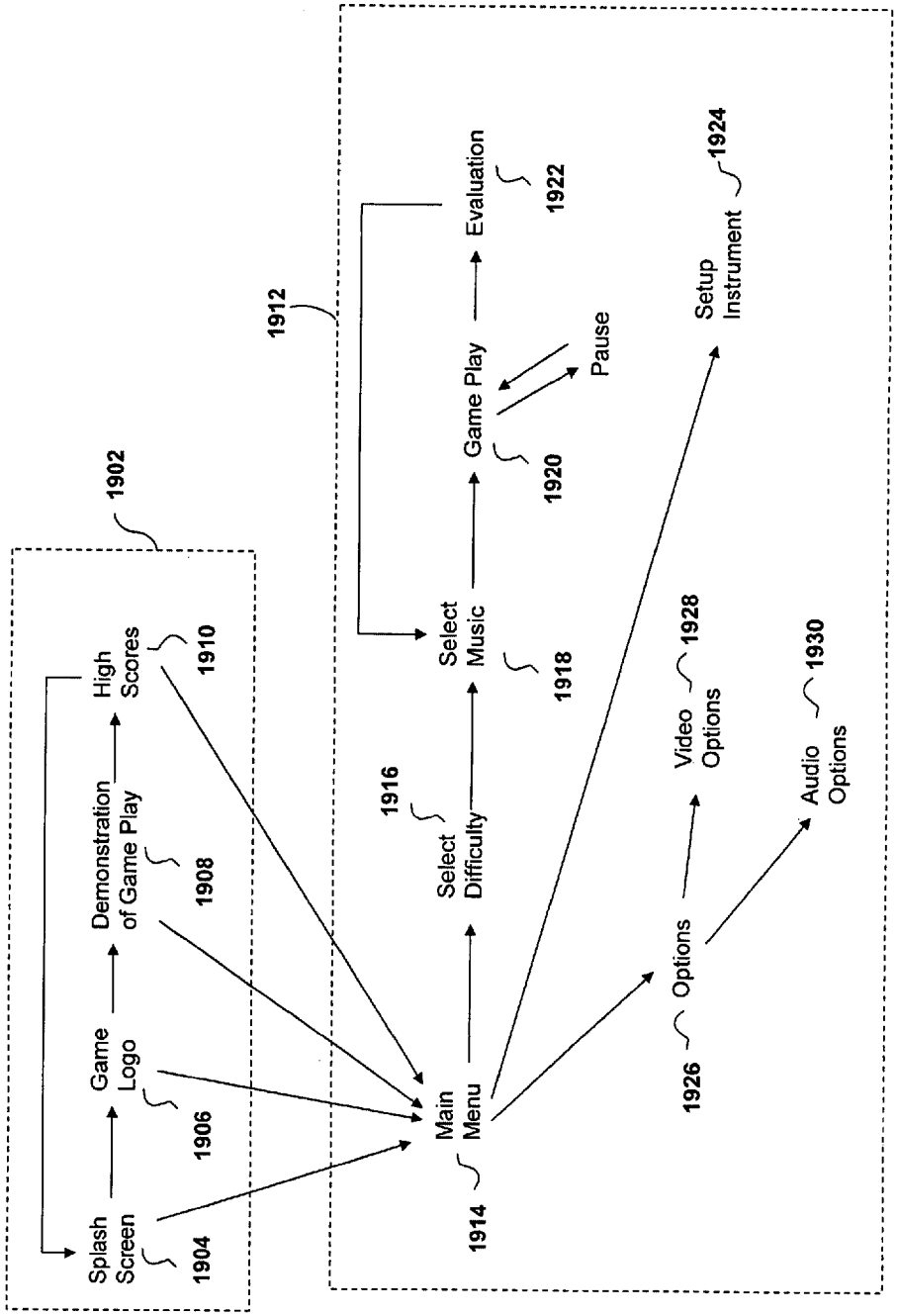
FIG. 19 illustrates an example of a menu in the stringed instrument example of the game system.
Figure 20:
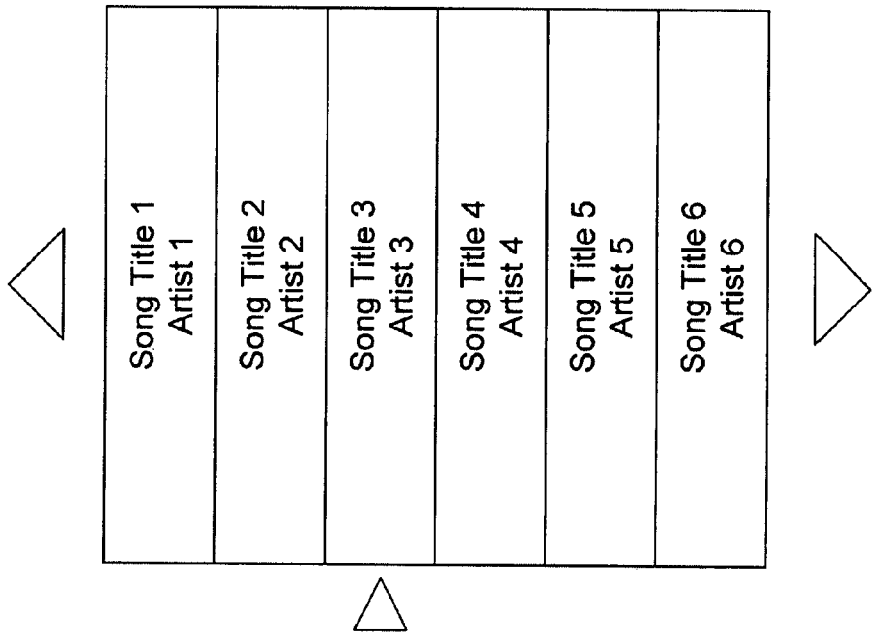
FIG. 20 illustrates an example of a select arrangement user interface of the stringed instrument example of the game system.
Figure 21:
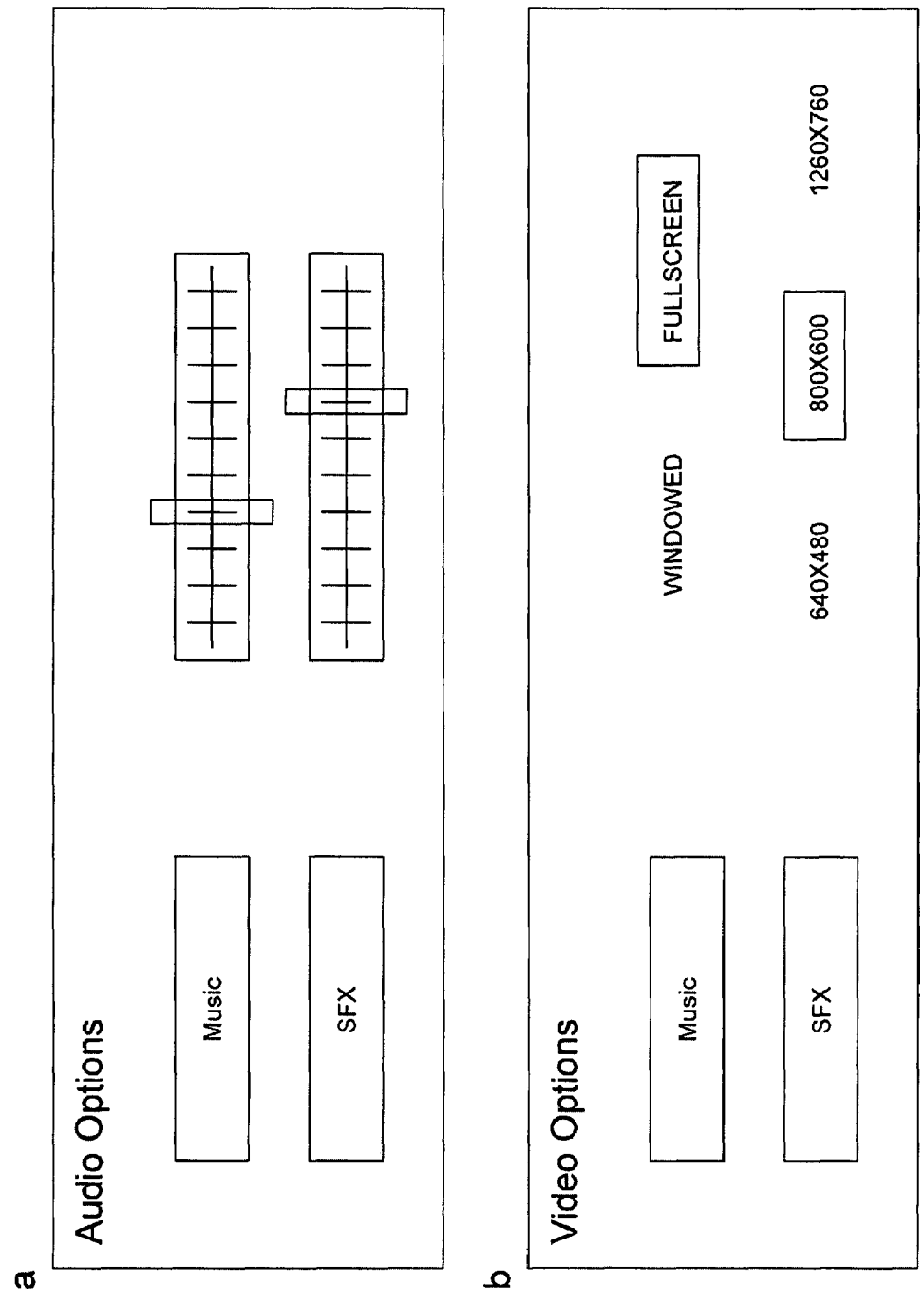
FIGS. 21A and 21B illustrate an audio and video selection user interface of the game system.
Figure 22:
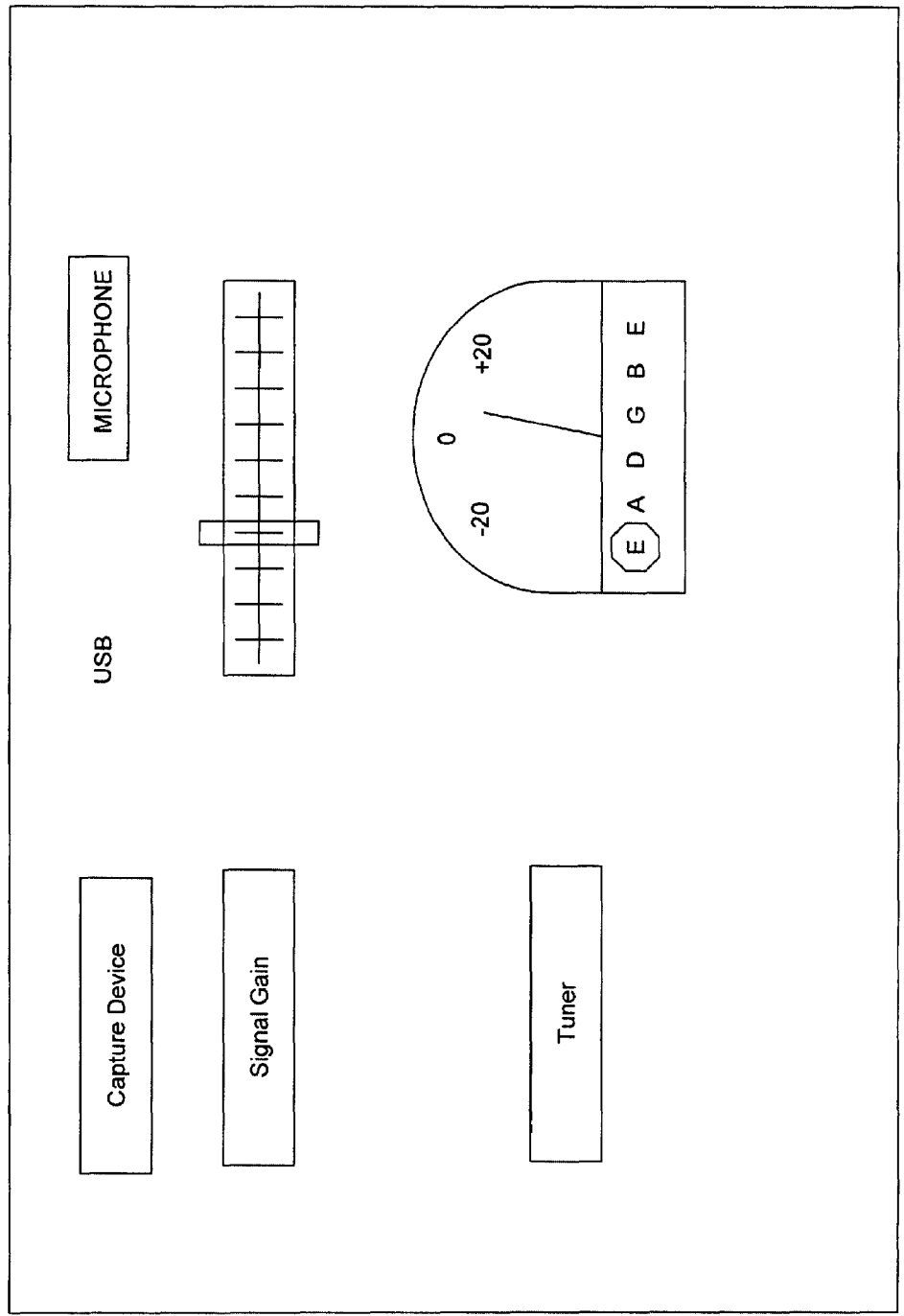
FIG. 22 illustrates a sound input device and gain user interface of the game system.

FIG. 19 illustrates an example of a progression of menu screens in the stringed instrument example of the game system wherein 1902 shows a non-interactive progression of screens, which may include a splash screen 1904 that displays the game developer's logo, a logo screen 1906 that displays the game logo, a demonstration screen 1908 that shows the game being autoplayed or played by a computer, and a list of high scores 1910. The user is taken to the interactive progression of screens 1912 after the user interacts with the game (i.e. presses Enter on the keyboard). The main menu 1914 lists available options. The select difficulty screen 1916 allow the player to select their desired song difficulty (FIG. 15). The select music screen allows the player to select a song to play (FIG. 20). The game play screen 1920 is the main game screen (FIG. 1B), which may be paused and then resumed. After game play, the player is taken to an evaluation screen 1922 to review their performance. From the main menu 1914, the player may select the setup instrument screen 1924 to tune their instrument and set up an appropriate sound input device and signal gain (FIG. 22). Also from the main menu 1914, the user may select other options 1926, which will give them the ability to adjust video options 1928 (fullscreen or windowed game, screen resolution, etc.) (FIG. 21b) or audio options 1930 (music volume, sound effects volume, etc.) (FIG. 21a).

Figure 23:
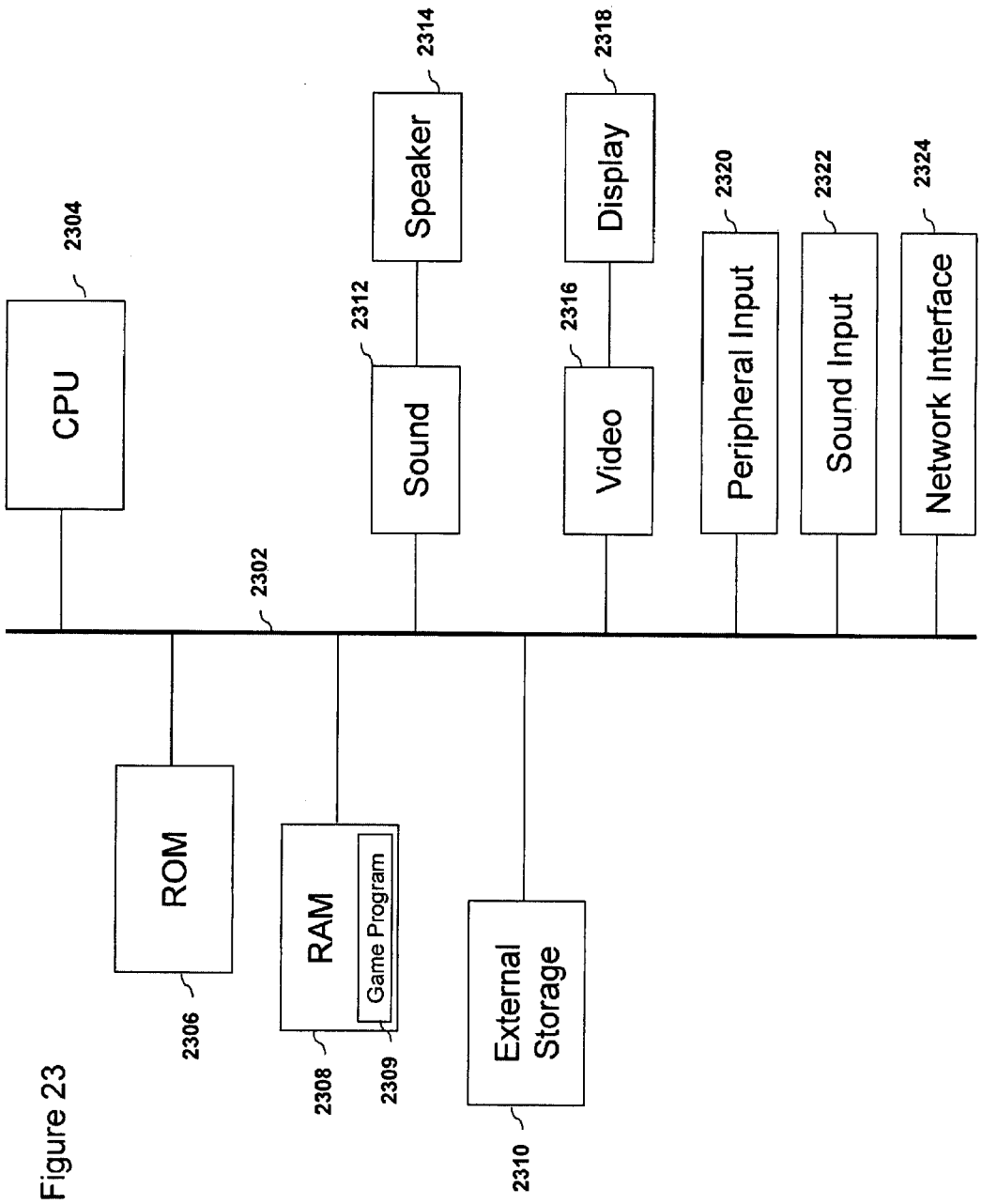
FIG. 23 illustrates an example of a hardware implementation of a video game system that incorporates the stringed instrument example of the game system.

FIG. 23 illustrates an example of a hardware implementation of a video game system that incorporates the stringed instrument example of the game system. The game system may include a system bus 2302, a ROM 2306 that holds the operating system and a memory 2308 (such as a RAM) that holds the game program 2309. The game system may also include an external storage 2310 that can either be a computer's hard drive, an optical disk, or a flash memory drive, etc. The game system also has a sound module 2312 that connects to the speaker 2314 and a video module 2316 that processes graphics and connects the display 2318, which can be a computer monitor, TV, or arcade screen. The game system may also have a peripheral input 2320 that takes input from the user's keyboard, mouse, buttoned game controllers, racing wheels, etc and a sound input 2322 that takes input from the user's musical instrument and can be a USB cable, microphone, amplifier cord with adapter for computer sound card, networking cable carrying musical data information, etc. The game system may also have a network interface 2324 that takes data in and sends data out over a network for networked play and it can send or receive game data (player profiles, "Hits", "Misses", etc.), sound data (from a musical instrument), or music data (i.e. .mp3 or .ogg data from a music file).

Figure 24:
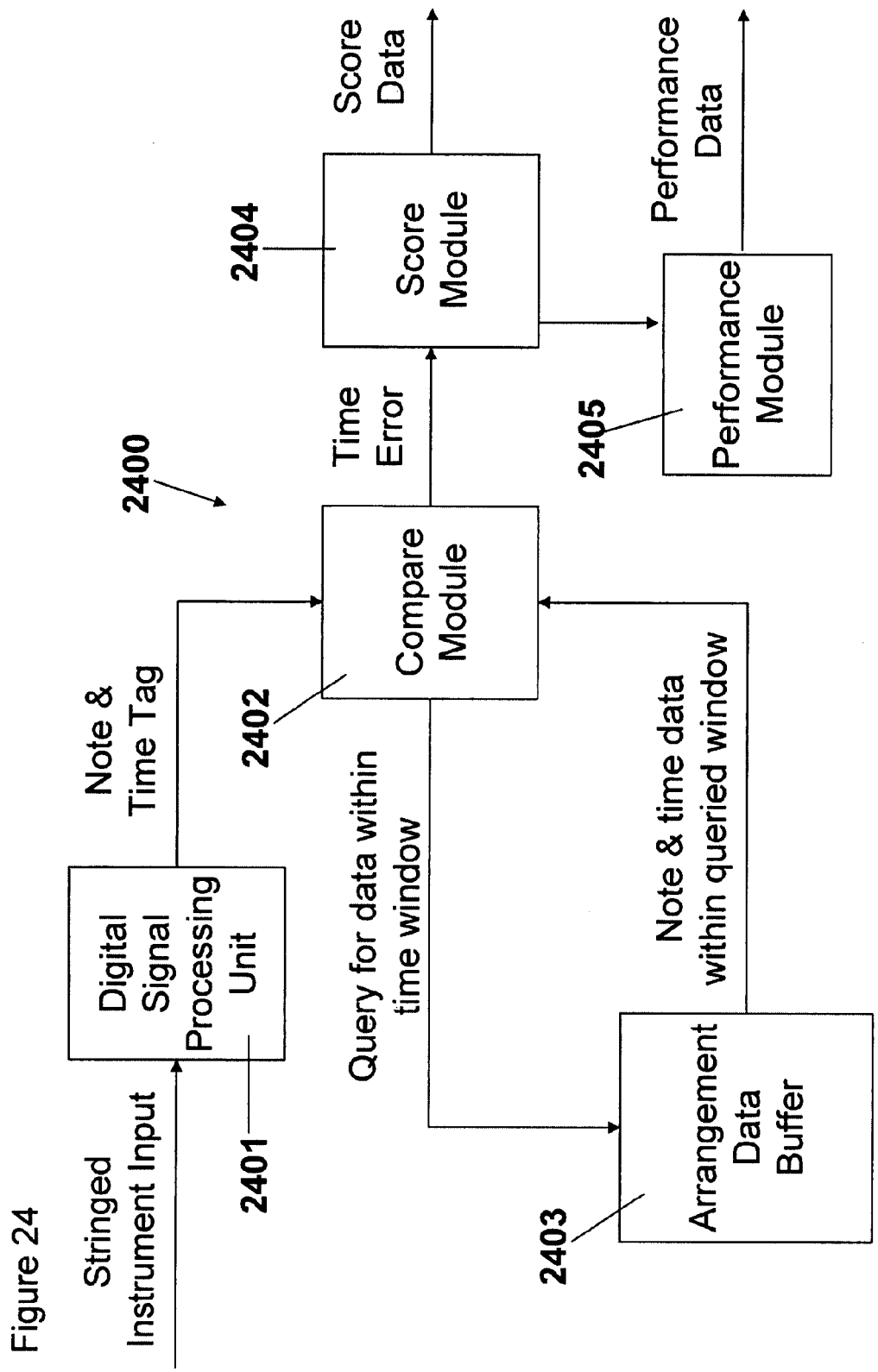
FIG. 24 illustrates further details of an analysis module of the exemplary embodiment of the game system shown in FIG. 1A.

FIG. 24 illustrates further details of an analysis module 2400 that is part of the exemplary embodiment shown in FIG. 1A. The analysis module may receive an instrument input that is fed into a processing unit 2401, such as a digital signal processing unit (DSP), that detects one or more notes (and a time tag for each note) in the live instrument input using known pitch conversion and note detection processes (described above) programmed into the DSP. The note and time tag information may be fed into a compare module 2402 (implemented as one or more lines of computer code in one embodiment) that queries the arrangement storage at a particular time period and then compares the live performance notes and time tags to a set of arrangement performance notes and time tags that may be stored in a buffer 2403 as shown. The comparison may be done by determining if the notes match and, if the notes match, then finding the live instrument note with the smallest time error. The compare module then may output a time error to a score module 2404 (implemented as one or more lines of computer code in one embodiment) that generates score data which is output to the player and also output to a performance module 2405 (implemented as one or more lines of computer code in one embodiment) that outputs performance data that indicates the performance level of the particular player.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A non-transitory computer readable storage medium having a computer program stored thereon for instructing playing of a musical instrument performance using a musical instrument, wherein execution of the computer program by at least one processing element performs the following steps:
   presenting, on a graphical user interface associated with a display, a plurality of note symbols each respectively representing a note of the musical instrument performance;
   presenting, on said graphical user interface, at least one chord symbol representing at least one chord of the musical instrument performance,
   wherein the presenting of said plurality of note symbols each respectively representing a note of the musical instrument performance coincides with said presenting the at least one chord symbol representing the at least one chord of the musical instrument performance, such that the presented said at least one chord visually lines up on the graphical user interface with the presented said plurality of note symbols;
   assigning a time window for a first of said plurality of note symbols,
   wherein said time window includes a time indication of an exact accuracy of play,
   wherein said time window represents a range of time for scoring of an accuracy of play of a first note representing said first of said plurality of note symbols,
   wherein the accuracy of play is evaluated based on how close in time the first note is played relative to the time indication of the exact accuracy of play;
   receiving, from the musical instrument, a first indication of play of said first note representing the first of said plurality of note symbols;
   receiving, from the musical instrument, a second indication of play of said first note representing the first of said plurality of note symbols,
   wherein both the first indication of play and the second indication of play indicate that the first note was played at least twice within the time window; and
   assigning a score indicative of the accuracy of play based on a shorter time between the respective first and second indications of play and the time indication of the exact accuracy of play.

2. The computer readable storage medium of claim 1, wherein the computer program instructs the at least one processing element to perform the steps of:
   assigning a level of difficulty to the presented plurality of note symbols; and
   adjusting the level of difficulty,
   wherein adjusting the level of difficulty comprises: increasing the level of difficulty by adding the number of notes in the plurality of note symbols to be played and decreasing the level of difficulty of the plurality of note symbols by reducing a number of notes in the plurality of note symbols to be played.

3. The computer readable storage medium of claim 2, wherein adjusting the level of difficulty further comprises cueing an harmony to be played with the melody.

4. The computer readable storage medium of claim 2, wherein the level of difficulty is set by receiving input from a player.

5. The computer readable storage medium of claim 1, wherein the computer program instructs the at least one processing element to perform the step of displaying a performance metric.

6. The computer readable storage medium of claim 1, wherein either or both of the first and second indication of play is disregarded if not equal to said first note representing the first of said plurality of note symbols.

7. A non-transitory computer readable storage medium having a computer program stored thereon for instructing playing of a musical instrument performance using a musical instrument, wherein execution of the computer program by at least one processing element performs the following steps:
   presenting, on a graphical user interface associated with a display, a plurality of note symbols each respectively representing a note of the musical instrument performance;
   assigning a time window for a first of said plurality of note symbols,
   wherein said time window includes a time indication of an exact accuracy of play,
   wherein said time window represents a range of time for scoring of an accuracy of play of a first note representing said first of said plurality of note symbols,
   wherein the accuracy of play is evaluated based on how close in time the first note is played relative to the time indication of the exact accuracy of play;
   receiving, from the musical instrument, a first indication of play of said first note representing the first of said plurality of note symbols;
   receiving, from the musical instrument, a second indication of play of said first note representing the first of said plurality of note symbols,
   wherein both the first indication of play and the second indication of play indicate that the first note was played at least twice within the time window; and
   assigning a score indicative of the accuracy of play based on a shorter time between the respective first and second indications of play and the time indication of the exact accuracy of play.

8. The computer readable storage medium of claim 7, wherein the computer program instructs the at least one processing element to perform the steps of:
   assigning a level of difficulty to the presented plurality of note symbols; and
   adjusting the level of difficulty,
   wherein adjusting the level of difficulty comprises: increasing the level of difficulty by adding the number of notes in the plurality of note symbols to be played and decreasing the level of difficulty of the plurality of note symbols by reducing a number of notes in the plurality of note symbols to be played.

9. The computer readable storage medium of claim 8, wherein adjusting the level of difficulty further comprises cueing an harmony to be played with the melody.

10. The computer readable storage medium of claim 8, wherein the level of difficulty is selected by receiving input from a player.

11. The computer readable storage medium of claim 7, wherein the computer program instructs the at least one processing element to perform the step of displaying a performance metric.

12. The computer readable storage medium of claim 7, wherein either or both of the first and second indication of play is disregarded if not equal to said first note representing the first of said plurality of note symbols.

* * * * *